US007830540B2

(12) United States Patent
Matsuda

(10) Patent No.: US 7,830,540 B2
(45) Date of Patent: Nov. 9, 2010

(54) COMMUNICATION APPARATUS

(75) Inventor: Makoto Matsuda, Aisai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1249 days.

(21) Appl. No.: 11/341,642

(22) Filed: Jan. 30, 2006

(65) Prior Publication Data

US 2006/0172730 A1 Aug. 3, 2006

(30) Foreign Application Priority Data

Jan. 31, 2005 (JP) ............................. 2005-023951

(51) Int. Cl.
*H04N 1/04* (2006.01)
(52) U.S. Cl. ...................... 358/1.15; 358/402; 358/407; 358/403
(58) Field of Classification Search ................ 358/1.15, 358/402, 407, 403
See application file for complete search history.

(56) References Cited

U.S. PATENT DOCUMENTS

| | | | |
|---|---|---|---|
| 5,050,004 A * | 9/1991 | Morton, Jr. ................. | 358/405 |
| 6,665,719 B1 | 12/2003 | Isoda | |
| 6,700,674 B1 * | 3/2004 | Otsuka et al. .............. | 358/1.15 |
| 7,124,094 B1 | 10/2006 | Kobayashi et al. | |
| 7,283,269 B2 * | 10/2007 | Tanimoto ................... | 358/1.15 |
| 2002/0113998 A1 | 8/2002 | Fujinawa | |
| 2004/0039824 A1 | 2/2004 | Isoda | |
| 2004/0177337 A1* | 9/2004 | Iida et al. .................... | 717/104 |
| 2004/0186801 A1 | 9/2004 | Morita | |

FOREIGN PATENT DOCUMENTS

| | | | |
|---|---|---|---|
| JP | H10-333856 A | 12/1998 | |
| JP | 2000 36824 | 2/2000 | |
| JP | 2001 111801 | 4/2001 | |
| JP | 2001 358892 | 12/2001 | |
| JP | 2002-014796 A | 1/2002 | |

(Continued)

OTHER PUBLICATIONS

Japan Patent Office, Notification of Reasons for Rejection mailed Nov. 11, 2008, in priority Patent Application No. JP 2005-023951.

(Continued)

*Primary Examiner*—Houshang Safaipour
(74) *Attorney, Agent, or Firm*—Baker Botts L.L.P.

(57) ABSTRACT

A communication system including a transmission apparatus configured to transmit output data and a reception apparatus configured to receive the output data. The reception apparatus includes an output unit configured to execute an outputting procedure based on the output data, an abnormal state notification unit configured to transmit abnormal state notification data to the transmission apparatus, and a retransmission requesting unit configured to transmit retransmission request data if the outputting procedures is not executed normally. Further, the transmission apparatus is provided with an output data transmitting unit configured to transmit the output data to the reception apparatus, a transmission terminating unit configured to terminate transmission of the output data if the abnormal state notification data is received from the reception apparatus, and an output data retransmitting unit configure to transmit the output data requested by the retransmission requesting unit to the reception apparatus when the retransmission request data is received.

13 Claims, 15 Drawing Sheets

FOREIGN PATENT DOCUMENTS

| | | |
|---|---|---|
| JP | 2002-103751 A | 4/2002 |
| JP | 2002-244835 A | 8/2002 |
| JP | 2003-263286 A | 9/2003 |
| JP | 2004-220098 A | 8/2004 |
| JP | 2004-287665 A | 10/2004 |
| JP | 2005-005794 A | 1/2005 |

OTHER PUBLICATIONS

Chinese Patent Office Notification of The First Office Action for CN200610002843.0, issued Feb. 29, 2008.

* cited by examiner

RETRY REGISTRATION SERVICE LIST

| SERVICE NAME | USAGE DATE/TIME | SESSION ID | NUMBER OF PRINTED PAGES |
|---|---|---|---|
| TRANSLATION COPY | 2004/12/24 15:30 | SS1 | 10 |
| NEWS DELIVERY | 2004/12/18 21:10 | SS2 | 0 |
| ... | ... | ... | ... |

FIG. 4

SESSION MANAGEMENT INFORMATION

| USER ID | SESSION ID | THE NUMBER OF PRINTED PAGES | FILE NAME | STORAGE COMPLETION FLAG |
|---------|------------|-----------------------------|-----------|-------------------------|
| AAA | SS1 | 10 | AAA.*** | 1 |
| BBB | SS2 | 0 | BBB.*** | 0 |
| ⋮ | ⋮ | ⋮ | ⋮ | ⋮ |

# COMMUNICATION APPARATUS

CROSS-REFERENCE TO RELATED APPLICATION

This application is related to Japanese Patent Application No. 2005-023951, filed on Jan. 31, 2005. The entire subject matter of the application is incorporated herein by reference.

BACKGROUND

1. Technical Field

Aspects of the invention relates to a data transmission apparatus configured to transmit output data, a data reception apparatus configured to receive the output data transmitted from the data transmission apparatus, and a communication system including the data transmission apparatus and the data reception apparatus.

2. Description of Related Art

The communication system of the above-described type has been known. An example of such a system is a facsimile system. In the facsimile system, the data transmission apparatus (i.e., a facsimile machine of a transmitting station) transmits image data (i.e., output data) representing an image of an original scanned by the facsimile apparatus at the transmitting station to a data reception apparatus (i.e., a facsimile machine at a destination station). The data reception apparatus (i.e., the facsimile machine at the destination station) receives the image data from the transmission apparatus, and prints the image on a recording sheet. If a communication error occurs during such a data communication (data transmission), the transmission apparatus once disconnects the communication line, and then attempts to retransmits the image data of the page of the original when the communication error has occurred, and the image data of the subsequent pages. An example of such a configuration is disclosed in Japanese Patent Provisional Publication No. P2001-111801A (hereinafter, referred to as '801 publication).

If the data transmission is stopped as an abnormal condition occurs and the image represented by the image data cannot be printed on the data reception side, it may take a relatively long time until the abnormal condition is cancelled. If, during such a period, the transmission apparatus repeatedly attempts to transmit the image data, unnecessary data communication is executed.

SUMMARY OF THE INVENTION

Aspects of the invention are advantageous in that the unnecessary transmission of the output data is prevented.

BRIEF DESCRIPTION OF THE ACCOMPANYING DRAWINGS

FIG. 1 is a block diagram showing a configuration of a communication system according to aspects of the invention.

FIG. 2 schematically shows an arrangement of an operation panel provided to an MFP (Multi Function Peripheral).

FIG. 4 shows a data structure of a retry registration service list to be stored in a storage unit of the MFP according to aspects of the invention.

DETAILED DESCRIPTION

General Overview

Figure 1:
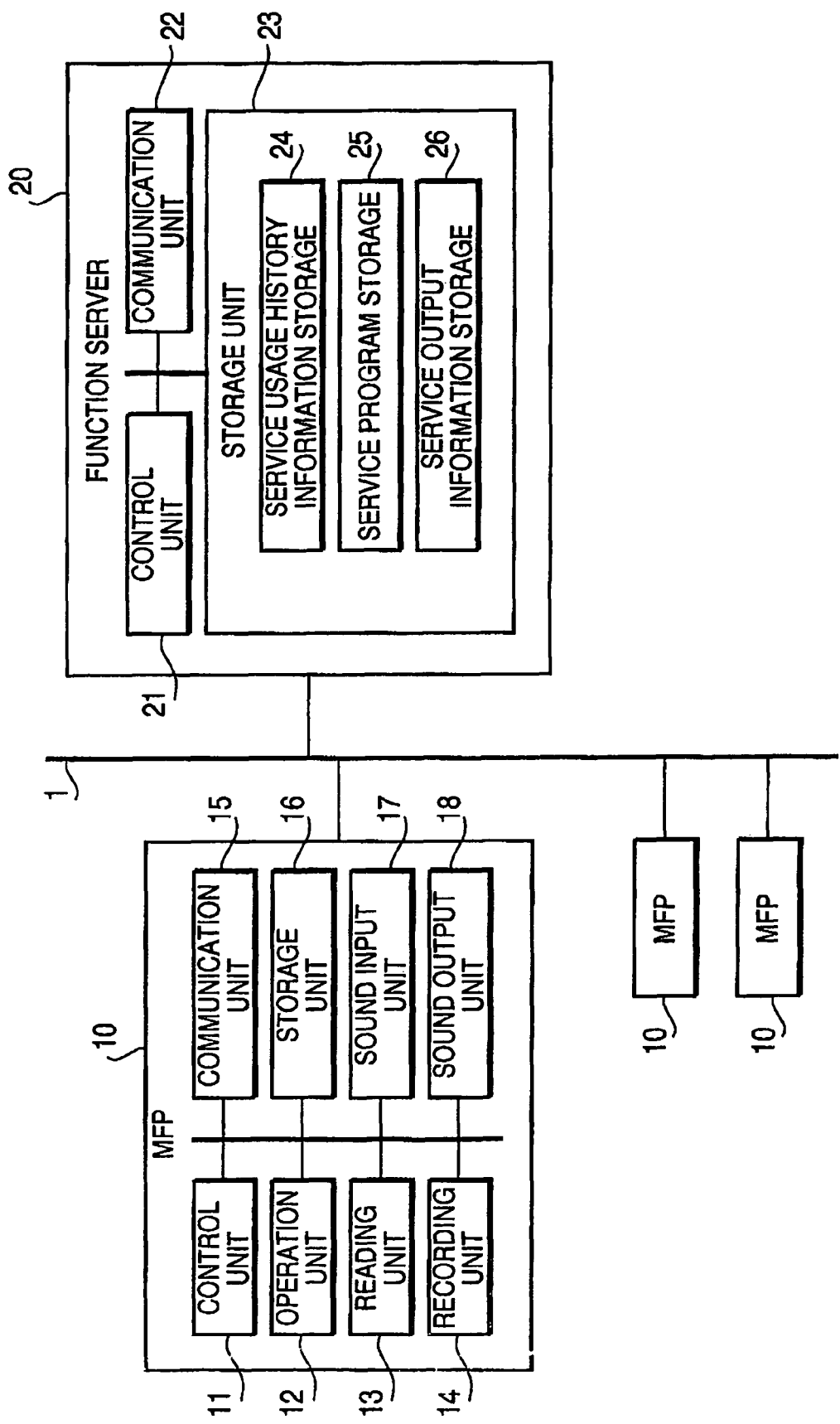

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Aspects of the invention provide a communication system including a transmission apparatus configured to transmit output data and a reception apparatus configured to receive the output data, the transmission apparatus and the reception apparatus being capable of communicating with each other. The reception apparatus is provided with an output unit configured to execute an outputting procedure based on the output data received from the transmission apparatus, an abnormal state notification unit configured to transmit abnormal state notification data indicating the abnormal state where the output unit cannot executes the outputting procedure normally to the transmission apparatus, and a retransmission requesting unit configured to transmit retransmission request data requesting for retransmission of the output data if the outputting procedures is not executed normally. Further, the transmission apparatus is provided with an output data transmitting unit configured to transmit the output data to the reception apparatus, a transmission terminating unit configured to terminate transmission of the output data by the output data transmitting unit if the abnormal state notification data is received from the reception apparatus, and an output data retransmitting unit configure to transmit the output data requested by the retransmission requesting unit to the reception apparatus when the retransmission request data is received.

The outputting unit may be configured to print images represented by the output data on a recording medium.

The reception apparatus may include a transmission requesting unit configured to transmit the transmission request data requesting for transmission of the output data to the transmission apparatus. Further, the output data transmitting unit may be configured such that, when the transmission request data is received from the reception apparatus, the output data transmitting unit transmits the requested output data to the reception apparatus.

The reception apparatus may further include a data inquiry unit configured to inquire the output data requested by the transmission request unit of the transmission apparatus periodically. Further, the output data transmitting unit may output the requested output data to the reception apparatus if the inquiry is received from the data inquiry unit and the request output data exists.

The transmission requesting unit may be configured to transmit predetermined data necessary for generating the output data to the transmission apparatus in addition to the transmission request data, and the transmission apparatus may include a data generating unit configured to generates the output data based on the predetermined data received from the reception apparatus. Further, the output data transmitting unit may be configured to output the output data generated by the data generating unit to the reception apparatus.

The output data retransmitting unit may be configured such that, when the retransmission request data is received from the reception apparatus and if the reception of the predetermined data necessary for generating the output data requested by the retransmission request data, the output data retransmitting unit transmits the output data generated based on the predetermined data which has already been received to the reception apparatus.

The transmission apparatus may include an output data storage configured to store the output data generated by the data generating unit, and the output data retransmitting unit may be configured such that, if the retransmission request data is received from the reception apparatus, and the output data requested by the retransmission request data is stored in the output data storage, the output data retransmitting unit transmits the stored output data to the reception apparatus.

The retransmission request unit may be configured to transmit the retransmission request data to the transmission apparatus together with identifying information with which the output data to be retransmitted can be identified.

Aspects of the invention provide a data transmission apparatus configured to serve as a transmission apparatus for a communication system including the transmission apparatus configured to transmit output data and a reception apparatus configured to receive the output data, the transmission apparatus and the reception apparatus being capable of communicating with each other, the reception apparatus having an output unit configured to execute an outputting procedure based on the output data received from the transmission apparatus, an abnormal state notification unit configured to transmit abnormal state notification data indicating the abnormal state where the output unit cannot executes the outputting procedure normally to the transmission apparatus, and a retransmission requesting unit configured to transmit retransmission request data requesting for retransmission of the output data if the outputting procedures is not executed normally. The transmission apparatus may include an output data transmitting unit configured to transmit the output data to the reception apparatus, a transmission terminating unit configured to terminate transmission of the output data by the output data transmitting unit if the abnormal state notification data is received from the reception apparatus, and an output data retransmitting unit configure to transmit the output data requested by the retransmission requesting unit to the reception apparatus when the retransmission request data is received.

Aspects of the invention provide a computer program product comprising computer readable instructions that cause a computer to serve as the data transmission apparatus as above.

Aspects of the invention provide an output apparatus configured to serve as a reception apparatus for a communication system including a transmission apparatus configured to transmit output data and the reception apparatus configured to receive the output data, the transmission apparatus and the reception apparatus being capable of communicating with each other, the transmission apparatus including an output data transmitting unit configured to transmit output data to the reception apparatus, a transmission terminating unit configured to terminate transmission of the output data by the output data transmitting unit if the abnormal state notification data is received from the reception apparatus, and an output data retransmitting unit configure to transmit the output data requested by the retransmission requesting unit to the reception apparatus when the retransmission request data is received. The reception apparatus may include an output unit configured to execute an outputting procedure based on the output data received from the transmission apparatus, an abnormal state notification unit configured to transmit abnormal state notification data indicating the abnormal state where the output unit cannot executes the outputting procedure normally to the transmission apparatus, and a retransmission requesting unit configured to transmit retransmission request data requesting for retransmission of the output data if the outputting procedures is not executed normally.

The outputting unit may be configured to print images represented by the output data on a recording medium.

Aspects of the invention provide a computer program product comprising computer readable instructions that cause a computer to serve as the output apparatus as above.

In particular, according to aspects of the invention, there is provided a computer program product comprising computer readable instructions that cause a computer to serve as a data transmission apparatus configured to serve as a transmission apparatus for a communication system including the transmission apparatus configured to transmit output data and a reception apparatus configured to receive the output data, the transmission apparatus and the reception apparatus being capable of communicating with each other. The transmission apparatus realized by the computer may include an output data transmitting unit configured to transmit the output data to the reception apparatus, a transmission terminating unit configured to terminate transmission of the output data by the output data transmitting unit if abnormal state notification data is received from the reception apparatus, and an output data retransmitting unit configure to transmit the output data requested by a retransmission requesting unit to the reception apparatus when retransmission request data is received.

According to aspects of the invention, there is provided a computer program product comprising computer readable instructions that cause a computer to serve as a data transmission apparatus configured to serve as a transmission apparatus for a communication system including the transmission apparatus configured to transmit output data and a reception apparatus configured to receive the output data, the transmission apparatus and the reception apparatus being capable of communicating with each other. The transmission apparatus realized by the computer may include an output data transmitting unit configured to transmit the output data to the reception apparatus, a transmission terminating unit configured to terminate transmission of the output data by the output data transmitting unit if abnormal state notification data is received from the reception apparatus, and an output data retransmitting unit configure to transmit the output data requested by a retransmission requesting unit to the reception apparatus when retransmission request data is received.

According to aspects of the invention, there is provided a computer program product comprising computer readable instructions that cause a computer to serve as an output apparatus configured to serve as a reception apparatus for a communication system including a transmission apparatus configured to transmit output data and the reception apparatus configured to receive the output data, the transmission apparatus and the reception apparatus being capable of communicating with each other. The reception apparatus realized by the computer may include an output unit configured to execute an outputting procedure based on the output data received from the transmission apparatus, an abnormal state notification unit configured to transmit abnormal state notification data indicating the abnormal state where the output unit cannot executes the outputting procedure normally to the transmission apparatus, and a retransmission requesting unit configured to transmit retransmission request data requesting for retransmission of the output data if the outputting procedures is not executed normally.

EMBODIMENT

Hereinafter, referring to the accompanying drawings, a communication system according to an illustrative embodiment of the invention will be described.

FIG. 1 is a block diagram illustrating a system configuration of the communication system according to an illustrative embodiment. The communication system is provided with multiple MFPs 10, 10, . . . and a function server 20, which are connected with each other through a network 1 (which is the Internet, in the illustrative embodiment) so that data communication is performed thereamong.

The MFP 10 is configured to have functions of a telephone (audio communication), a scanner, a printer, a copier, and a facsimile machine. As show in FIG. 1, the MFP 10 includes a control unit 11, an operation unit 12, a reading unit 13, a recording unit 14, a communication unit 15, a storage unit 16, a sound input unit 17 and a sound output unit 18.

The control unit 11 includes a well-known microcomputer provided with a CPU (Central Processing Unit), a ROM (Read Only Memory), a RAM (Random Access Memory) and the like, and controls an entire operation of the MFP 10.

Figure 2:
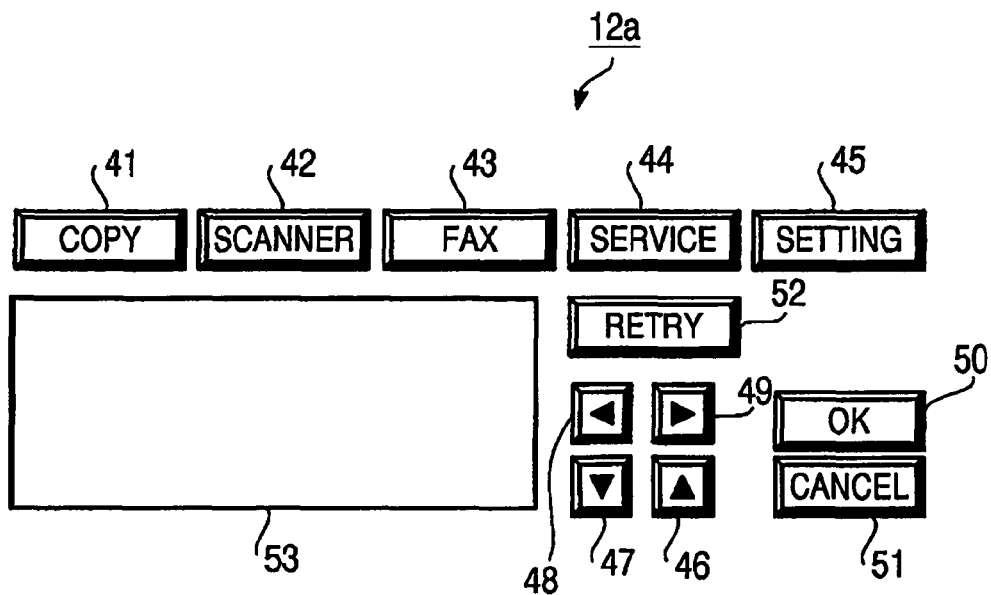

The operation unit 12 includes an operation panel 12*a* (see FIG. 2) which is provided on a casing (not shown) of the MFP 10. Through the operation panel 12*a*, the control unit 11 receives user's input. Further, various information is displayed on the operation panel 12*a*.

Specifically, the operation panel 12*a* includes input section (key group) that acquire user's input operation. The input section includes a copy key 41, a scanner key 42, a FAX key 43, a service key 44, a set key 45, up/down/left/right keys 46, 47, 48 and 49, an OK key 50, a cancel key 51 and a retry key 52. Further, a display 53 for displaying various pieces of information is provided. When the user input commands through the operation panel 12*a*, the operation unit 12 transmits the input commands to the control unit 11. The display unit 53 displays various pieces of information in accordance with the input commands.

The scanning unit 13 reads images on an original with a well-known image sensor such as a CCD (Charge Coupled Device) or CIS (Contact Image Sensor) in accordance with a command of the control unit 11, and generates image data representing the read images. Specifically, the reading unit 13 includes an ADF (Auto Document Feeder) which enables the reading unit 13 to read a stack of original sheets placed on tray one after another so that the images on multiple original sheets can be automatically read.

The recording unit 14 is configured to feed multiple recording sheets stacked on a sheet feed cassette (tray) one after another, and form an image on the recording sheet in accordance with a well-known image formation method such as an electrophotographic method, an inkjet printing method and the like. The sheets on which images are formed are discharged from the recording unit 14 and stacked on discharged sheet tray. It should be noted that the images formed by the recording unit 14 includes, for example, images formed by the reading unit 13, facsimile data received by the facsimile function, image data received from an external device such as a personal computer (not shown) or a function server 20.

The communication unit 14 operates to receive/transmit data through the network 1. The storage unit 16 is configured to store various pieces of data in a non-volatile RAM (not shown). The sound input unit 17 acquires sound through a microphone provided to a handset (not shown) of the MFP 10, and generates sound data (PCM data) representing the input sound.

The sound output unit 18 outputs sound represented by the sound data through a speaker provided to the handset and/or through a speaker provided to the may body of the MFP 10.

Next, a configuration of the function server 20 will be described below.

The function server 20 receives a service request from the MFP 10 and provides a service to the MFP 10 that issued the request. The function server 20 is provided with a control unit 21, a communication unit 22 and a storage unit 23.

The control unit 21 includes a well-known microcomputer having a CPU, a ROM and a RAM, and controls an entire operation of the function server 20. The communication unit 22 operates to transmit/receive data through the network 1.

The storage unit 23 is configured to store various pieces of data on a hard disk (not shown). Specifically, the storage unit 23 is provided with a session management information storage 24 for storing session management information (see FIG. 13), described later, a service program storage 25 for storing a service program (described later), and a service output information storage 26 for storing output data (described later).

The service program stored in the service program storage 25 is a program that provides a service to the MFP 10. Specifically, in the service program storage 25, multiple kinds of service programs corresponding to multiple services which can be provided to the MFP 10 are stored. When one of the service programs is executed, the service corresponding to the executed service program is provided to the MFP 10. Specifically, the services include:

a translation copy service that extracts a text from an image read by the reading unit 13 of the MFP 10, translates the extracted text into a target language, converts the translated text into print data representing the image to be printed, and prints using the recording unit 14 of the MFP 10;

a news delivery service that obtains latest new data from a predetermined database, generates print data representing the thus obtained news data, and controls the recording unit 14 of the MFP 10 to print the print data; and a read-aloud service that extracts a text from the image read by the reading unit 13 of the MFP 10, converts the extracted text to sound data, and controls the sound output unit 18 of the MFP 10 to output the thus generated sound data representing the read-around sound of the extracted text.

Next, procedures executed by the communication systems will be explained with reference to flowcharts.

When the user depresses the service key 44 of the operation panel 12*a*, the MFP 10 displays a service selection window (not shown) allowing the user to select a desired one of multiple kinds of services (which can be provided by the function server 20) on the display 53 of the operation panel 12*a*. It should be noted that the contents of the services the function server 20 can provide may be stored in the MFP 10 in advance. Alternatively, if data indicating the contents the function server 20 can provide is provided from an external device (e.g., the function server 20 or another device) to the MFP 10, even if the contents may change, the latest service list may be displayed on the display 53 for user's selection.

When the user selects one of the services through the service selection window, which is displayed on the display 53, the MFP 10 next displays an ID input window asking the user to input the user ID and the password on the display 53 of the operation panel 12*a*.

The user ID and the password are identifying information intrinsic to each user and are necessary for receiving the services provided by the function server 20. The user ID and the password are assigned when the user mad a predetermined registration procedure with respect to a service provider. Typically, the registration procedure can be made through the operation panel 12*a* of the MFP 10 or a personal computer.

When the user input the user ID and the password through the ID input window displayed on the display 53, the MFP 10 transmits a request for the service selected through the service selection window to the function server 20.

When the request for the service is received, the function server 20 executes a program corresponding to the service and transmits the data corresponding to the service content (e.g., print data, sound data etc., hereinafter simply referred to as output data) to the MFP 10 that issued the service request.

The communication system is configured such that, if the service has not completed normally, the MFP 10 can request for retry (retransmission of the output data) of the service. That is, when the retry key 52 of the operation panel 12*a* is depressed, the MFP 10 displays a retry service selection window (see FIG. 3A) allowing the user to select a service subjected to the retry on the display 53. Specifically, the MFP 10 is configured that information related to the service which has not completed normally is stored in the storage unit 16 as a retry registration list (see FIG. 4). The list is displayed as a retry service selection window so that the names of the services which have not completed normally are indicated.

When the user selected a service from among the service names indicated on the retry service selection window displayed on the display 53, the MFP 10 displays a retry/deletion selection window (see FIG. 3B) allowing the user to select whether the selected service is to be retried or the output data stored in the function server 20 is to be deleted for retry.

If the user selects the retry on the retry/deletion select window, similarly to a case where a service is requested, the MFP 10 displays an ID input window for allowing the user to input the user ID and the password on the display 53 of the operation panel 12*a*. If the user has input the user ID and the password through the ID input window, a process for requesting the function server 20 for the retry of the service selected through the retry service selection window is executed.

If the user selects the deletion in the retry/deletion selection window, similarly to the above case where the service is requested, the ID input window asking the user to input the user ID and the password is displayed on the display 53 of the operation panel 12*a*. Then, when the user has input the use ID and the password, a process to request the function server for deletion of the output data corresponding to the service selected in the retry service selection window is executed.

Next, various procedures executed by the control unit 11 of the MFP 10 and the control unit 21 of the function server will be described.

MFP Procedure

Service Usage Procedure

First, a service usage procedure will be described. The service usage procedure is executed by the control unit 11 of the MFP 10 when the user has selected a service through the service selection window displayed on the display 53 of the operation panel 12*a*, and further input the user ID and the password through the ID input window.

It should be noted that the service usage procedure differs depending on the selected service (e.g., whether the image of the original is to be scanned using the reading unit 13). In the following description, a case where a translation copy service has selected will be described.

Figure 5:
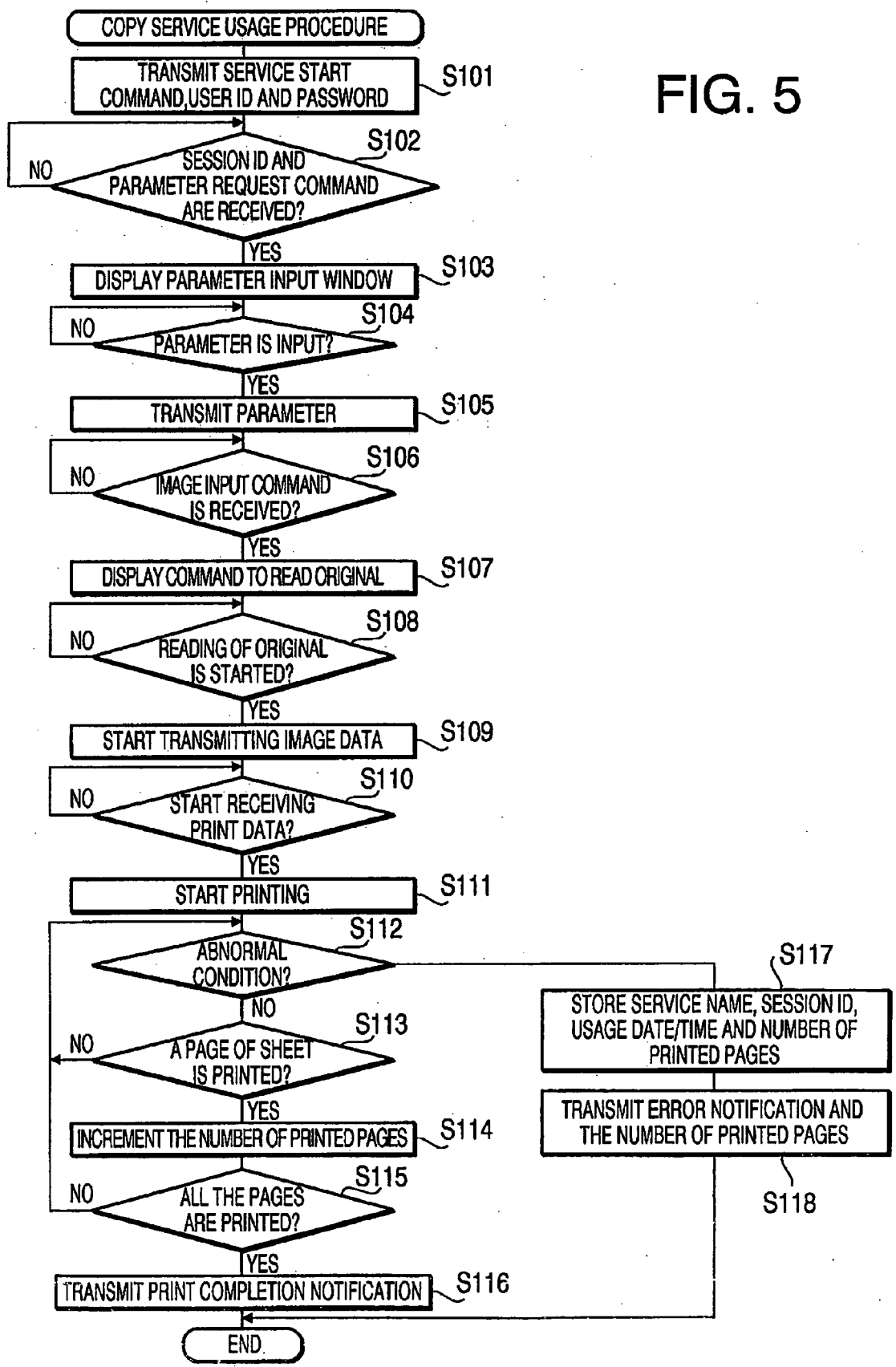
FIG. 5 shows a flowchart illustrating a copy service usage procedure according to aspects of the invention.

FIG. 5 shows a flowchart illustrating the service usage procedure, in which print data is generated based on image data scanned by the image reading unit 13.

When the service usage procedure is executed, the control transmits a service startup command for requesting the function server 20 for the service (i.e., the translation copy service in this illustrative example) selected through the service selection window, and the user ID and the password (for the user requesting the service) input through the ID input window to the function server 20.

In S102, the control judges whether the session ID and the parameter request command, which have been transmitted form the function server 20 in response to the transmission of the service startup command in S101, have been received. If the session ID and the parameter request command have been received, the control proceeds to S103. It should be noted that the session ID is identifying information intrinsic to each service request, and used for distinguishing communications related to multiple service commands, on the function server 20 side, from each other.

Specifically, in some of the following steps (i.e., S105, S109, S116 and S118) of the service usage procedure, the MFP 10 transmits data to be transmitted to the function server 20 together with its session ID. The function server 20 determines which service request the received data is related to based on the received session ID. It should be noted that the session ID is generated in S601 of a translation copy service procedure (FIG. 12) and transmitted to the MFP 10 that issued the service startup command together with the parameter request command in S602.

In S103, the control displays a parameter input window allowing the user to set parameters necessary for the service (i.e., for the translation copy service, in this example) on the display 53 of the operation panel 12*a* based on the received parameter request command. Specifically, the parameter request command includes XML (eXtensible Markup Language) data representing the parameter input window (see FIG. 6), and the MFP 10 displays the parameter input window on the display 53 based on the XML data.

Figure 6:
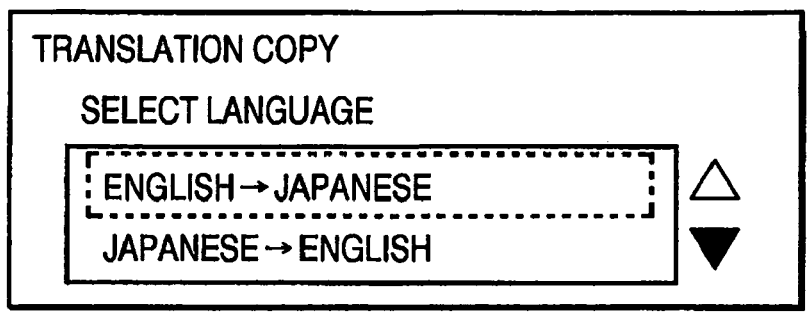
FIG. 6 shows a parameter input window according to aspects of the invention.

In this example, multiple kinds of parameters representing target languages of the translation copy service (i.e., "English→Japanese", "Japanese→English", etc.) are displayed. By depressing the up key 46 or the down key 47, a cursor (a rectangle drawn by broken lines) for selecting a parameter is moved upward or downward to highlight the selected parameter, and by depressing the OK key 50, the highlighted parameter is selected. It should be noted that, as the translation target language, further parameters (e.g., "English→French", "French→English") are available. However, due to a limited display area of the display 53, all the parameters cannot be displayed on the display 53 simultaneously. Therefore, the parameter input window is configured such that a parameter displaying area can be scrolled in either upper and lower directions. As shown in FIG. 6, a black one of the triangles (arrows) pointing upper/lower directions indicates that there are hidden parameters in that direction. It should be noted that some services may not require parameter settings. In such a case, the parameters may not be received in S102, and thus steps S103-S105 may not be executed.

In S104, the control pauses until the user inputs a parameter (in this example, until the user selects a parameter) through the parameter input window displayed in S103. When the user inputs the parameter, the control proceeds to S105.

In S105, the parameter (i.e., "English→Japanese", "Japanese→English", etc.) input by the user in S104 is transmitted to the function server 20. Then, in S106, the control judges whether the image input command transmitted, in response to the transmission of the parameter in S105, from the function server 20 is received. If the image input command has been received, the control proceeds to S107. It should be noted that the image input command is for requesting the MFP 10 to transmit image data necessary for providing a service (i.e., in this example, the image data is of an image subjected to the translation). The image input command is transmitted by the control unit 21 of the function server 20 in S604 of the translation copy service (FIG. 12: described later) executed by the control unit 21.

In S107, the control displays a message (e.g., "set the original and depress the OK key") asking the user to operate the reading unit 13 to read the original subjected to the translation copy service on the display 53 of the operation panel 12a.

In S108, the control pauses until reading of the original by the reading unit 13 is started (i.e., until the user operates to start reading the original), and, when started, the control proceeds to S109.

In S109, the control starts transmitting the image data representing the image on the original (i.e., the image data generated by the reading unit 13) to the function server 20.

Next, in S110, the control judges whether reception of the print data transmitted from the function server 20 is started in S110. When started, the control proceeds to S111.

In S111, the control controls the recording unit 14 to print the image represented by the print data received form the function server. Next, in S112, the control judges whether the recording unit 14 operates in an abnormal state (i.e., a state where the printing operation cannot be performed normally). It should be noted that the state where the printing operation cannot be performed includes, for example, a state where the recording sheets are not accommodated in the sheet feed cassette (or sheet feed tray), a state where the recording unit 14 runs short of the toner for forming the image on the recording, or the like.

If the control determines that no abnormal state has occurred, the control proceeds to S113 and judges whether the printing of one page of recording sheet has been finished. If it is determined that the printing for one page of recording sheet has not been completed (S113: NO), the control returns to S112.

If it is determined that the printing of one page of recording sheet has been completed (S113: YES), the control proceeds to S114, where a variable P representing the number of sheets on which the printing has been done is incremented (i.e., one is added to the variable P). It should be noted that the variable P is reset to zero when the printing is started (i.e., in S111). That is, using the variable P, the number of sheets on which the printing has been completed can be counted.

In S115, the control judges whether the printing of all the print data (i.e., all the pages to be printed) has been completed. If it is determined that all the print data has not been completed (S115: NO), the control returns to S112. That is, until all the print data has been completed, the control controls the recording unit 14 to continue a printing procedure.

If it is determined that all the print data has been printed (S115: YES), the control proceeds to S116, and transmits the print completion notification, which notifies that the images represented by the print data have been printed, to the function server. Thereafter, the control finishes the service usage procedure.

If it is judged that the abnormal status occurs (S112: YES), the control proceeds to S117. In S117, the control stores a service name of the requested service, the date/time when the copy service is started to be used, the session ID used for the communication, and the number P of recording sheet on which printing has been completed as the information related to the service that has not been normally completed (retry registration service list) in the storage unit 16 (see FIG. 4). It should be noted that the information stored in S117 is used when the print data is retransmitted or the deletion of the print data is requested.

Then, in S118, the control transmits an error notification notifying that the abnormal state has occurred, the number P of sheet on which printing has been done to the function server 20. Then, the control finishes the copy service usage procedure.

Next, taking a case where a news delivery service is selected through the service selection window displayed on the display 53 on the operation panel 12a of the MFP 10 as an example, a service usage procedure (i.e., a delivery service usage procedure) will be described.

Figure 7:
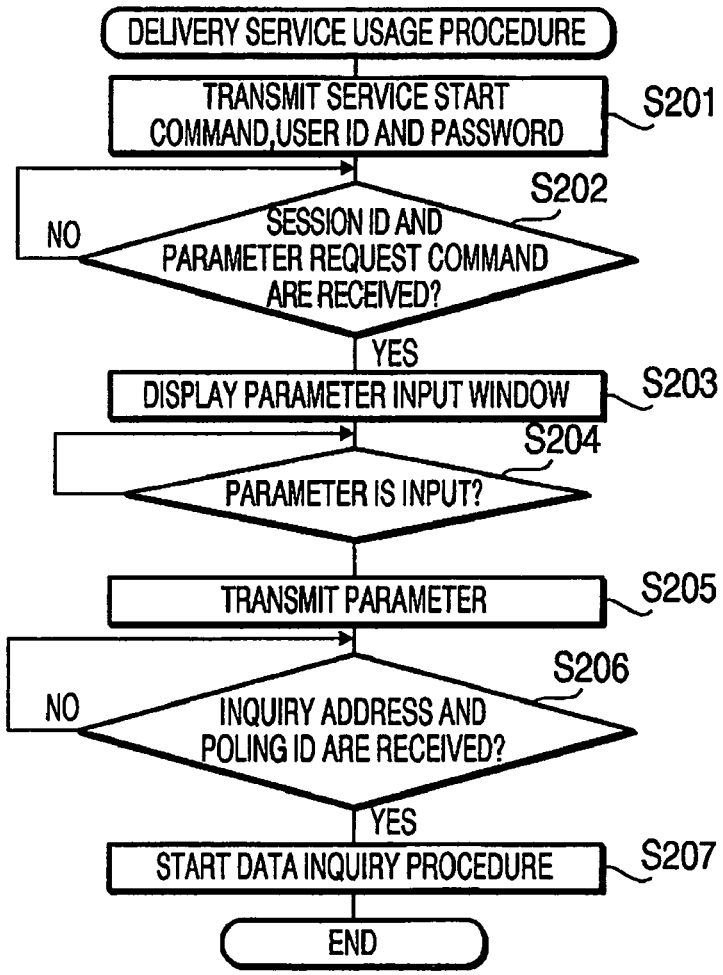
FIG. 7 shows a flowchart illustrating a delivery service usage procedure according to aspects of the invention.

FIG. 7 is a flowchart illustrating a delivery service usage procedure which is executed when the service for delivering the print data which is periodically updated such as the news delivery service.

When the delivery service usage procedure is started, the control starts transmitting a startup command for requesting the function server 20 for the service selected through the service selection window (the news delivery service, in this example), the user ID and the password (i.e., the user ID and the password of the user who requests for the service) to the function server 20, in S201.

Next, in S202, the control judges whether the session ID and the parameter request command, which are transmitted by the function server 20 in response to the service startup command in S201, are received. If received (S202: YES), the control proceeds to S203. In the following steps of the delivery service usage procedure (i.e., S205), the MFP 10 transmits the data to be transmitted together with the session ID to the function server 20. Then function server 20 identify to which service request the received data is related to based on the received session ID. It should be noted that the session ID is generated in S701 of the news delivery service procedure (FIG. 14) which is executed by the control unit 21 of the function server 20. The session ID is transmitted to the MFP 10 that has issued the service startup command together with the parameter request command (S702).

In S203, based on the received parameter request command, a parameter input window allowing the user to set the necessary parameters for the service (e.g., the news delivery service in this example) is displayed on the display 53 of the operation panel 12a. In this example, the parameter request command includes XML data representing the parameter input window, and the MFP 10 displays the parameter input window in accordance with the XML data. For example, for the news delivery service, multiple parameters ("politics", "economics", "sports", etc.) are displayed as selectable news genres. As in the translation copy service, by depressing the up key 46 and down key 47 of the operation panel 12a to move the cursor upward/downward to highlight a parameter and depressing the OK key 50, one of the listed parameters can be selected. Depending on the type of the service, it is unnecessary to set the parameter. In such case, for example, the control may proceeds such that the parameter request command is not be received in S202, and steps S203-S205 are not executed. Further, the parameter need not be limited to ones input by the user, but, for example, information (e.g., information related to the operational characteristic of the MFP 10 such as the size of the memory), or one of the current operational settings (e.g., recording sheet size).

In S204, the control pauses until the parameter is input (or selected) by the user through the parameter input window displayed on the display 53 in S203. When the parameter is input (or selected) (S204: YES), the control proceeds to S205.

In S205, the control transmits the input (or selected) parameter (e.g., "politics", "economics", "sports", etc.) to the function server 20.

Then, in S206, the control judges whether an inquiry address and poling ID, which are transmitted from the function server 20 in response to the transmission of the parameter in S205, are received. If received (S206: YES), the process proceeds to S207. The inquiry address here is defined as a communication destination URL which is referred to when data inquiry asking whether the requested print data exists is periodically transmitted to the function server 20 (i.e., poling process). The poling ID is the information used in the function server 20 when the poling process is performed to identify the MFP 10 that issued the inquiry.

In S207, a data inquiry process (see FIG. 8), described later, is started. Thereafter, the control finishes the delivery service usage procedure.

Next, the data inquiry procedure, which is called in S207 of the delivery service usage procedure, will be described with reference to a flowchart shown in FIG. 8.

When the data inquiry procedure is executed, in S301, the control judges whether it is time to transmit an inquiry to the function server 20 to inquire whether the requested print data exists. If the control determines that it is time to inquire (S301: YES), the control proceeds to S302. That is, in this data inquiry procedure, the steps after S302 (inquiry for the print data) will be executed periodically (e.g., once per hour), and in S301, the control judges whether it is time to transmit the inquiry to the function server 20.

In S302, the control transmits a data inquiry to the function server 20 (i.e., to the inquiry address received in S206 of the delivery service usage procedure) to check whether the requested print data (in this example, the print data of the news) exists. It should be noted that the poling ID received in S206 is transmitted together with the data inquiry.

In S303, the control judges whether information that is transmitted by the function server 20 in response to the data inquiry in S302 is received. If received (S303: YES), the control proceeds to S304.

In S304, in accordance with the received information, the control judges whether the data request procedure (see FIG. 9) is to be started. Specifically, if the received information includes a start command of the data request procedure and a destination URL to which the service (in this example, data request procedure) startup command is to be transmitted, the control determines that there is the print data and the printing procedure should be started. If the received information does not include such information, the control determines that the print data does not exit. It should be noted that the information received here is transmitted to the MFP 10 that has issued the data inquiry in S722 and S723 of a response procedure (FIG. 16) which is executed by the control unit 21 of the function server 20.

If the control determines that there is no print data (S304: NO), the control returns to S301. If the control determines that the print data exists (S304: YES), the control proceeds to S305, and the data request procedure (see FIG. 9) is started. Then, the control returns to S301.

Figure 9:
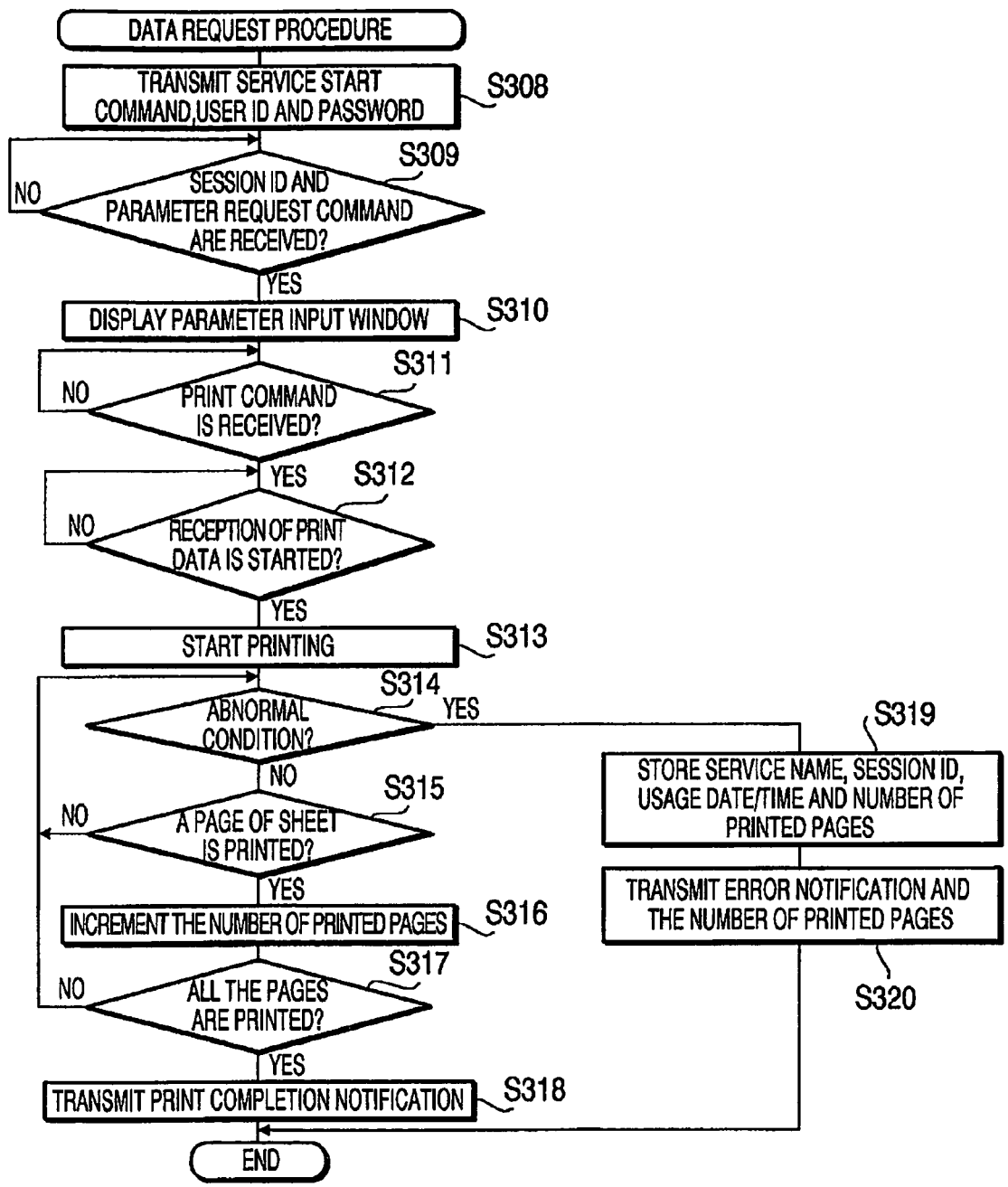
FIG. 9 shows a flowchart illustrating a data request procedure according to aspects of the invention.

The data request procedure which is called in S305 of the data inquiry procedure will be described with reference to a flowchart shown in FIG. 9. In the data request procedure (particularly in S308, S318 and S320), the MFP 10 transmits the data to be transmitted together with the session ID received in the above-described delivery service usage procedure to the function server 20. Then, the function server 20 identifies to which service the data is related based on the received session ID.

When the data request procedure is started, in S308, the control transmits the service startup command, and the user ID and password stored in the MFP 10 to the function server 20. It should be noted that the user ID and password the MFP 10 retains are ones stored in the MFP 10 in relation to each other when the user input when the user started to use the delivery service usage procedure. It should be noted that, depending on the configuration, the MFP 10 may store an owner ID representing the owner of the MFP 10 and the corresponding password, and as a default setting, the owner ID and the corresponding password may be transmitted. Alternatively, multiple users may be registered as the users of the same MFP 10, and the MFP 10 may store a password in association with each service.

In S309, the control judges whether the session ID and the parameter request command transmitted, in response to the service startup command transmitted in S308, from the function server 20 are received. If received (S309: YES), the control proceeds to S310.

In S310, the control displays the parameter input window. In the parameter input window displayed here, a window necessary for the service is displayed. That is, when the service is the delivery service, a cancel button to stop the printing operation if it is executed at a timing the user does not intend.

In S311, the control judges whether the print command transmitted from the function server 20 is received. If received (S311: YES), the control proceeds to S312. In S312, the control judges whether the reception of the print data, which is transmitted from the function server 20, is started. If started (S312: YES), the process proceeds to S313.

In S313, the process controls the recording unit 14 to start printing the image represented by the print data received from the function server 20. Next, in S314, the control judges whether the recording unit 14 is in an abnormal condition where the printing procedure cannot be normally executed.

If the control determines that the recording unit 14 does not operate in the abnormal condition (S314: NO), the control proceeds to S135 and judges whether an image for one recording sheet has finished. If the control determines that the printing for one recording sheet has not completed, the control returns to S314.

If the control determines that the printing for one recording sheet has finished (S315: YES), the control proceeds to S316, and increment the number P of the pages on which the printing has been performed. It should be noted that the number P is reset to zero when the printing is started in S313. That is, the number P represents the number of the sheets on which the images have been printed.

In S317, the control judges whether the printing for all the print data (i.e., printing of all the pages) has completed. If the control determines that all the print data has not been printed (S317: NO), the control returns to S315. That is, until all the print data is printed, the control keeps the recording unit 14 to continue the printing procedure.

If it is determined that all the print data has been printed (S317: YES), the control proceeds to S318. In S318, the control transmits a print completion notification, which notifies that all the images represented by the print data have been printed, to the function server 20. Then, the control finishes the data request procedure.

If the control determines that the abnormal condition occurs (S314: YES), the control proceeds to S319. In S319, the control stores, in the storage unit 16, the name of the requested service, the date/time when the data request procedure was started, the session ID used for the communication, and the number P of the sheets on which the printing has been completed, information regarding the services which have not been completed normally (i.e., retry registration service list). The information stored in S319 us used when the print data is retransmitted or deleted.

In S320, the control transmits an error notification for notifying that an error (i.e., an abnormal condition) has occurred, the number P of recording sheets on which print has completed to the function server 20. Thereafter, the control stops the data request procedure.

Figure 10:
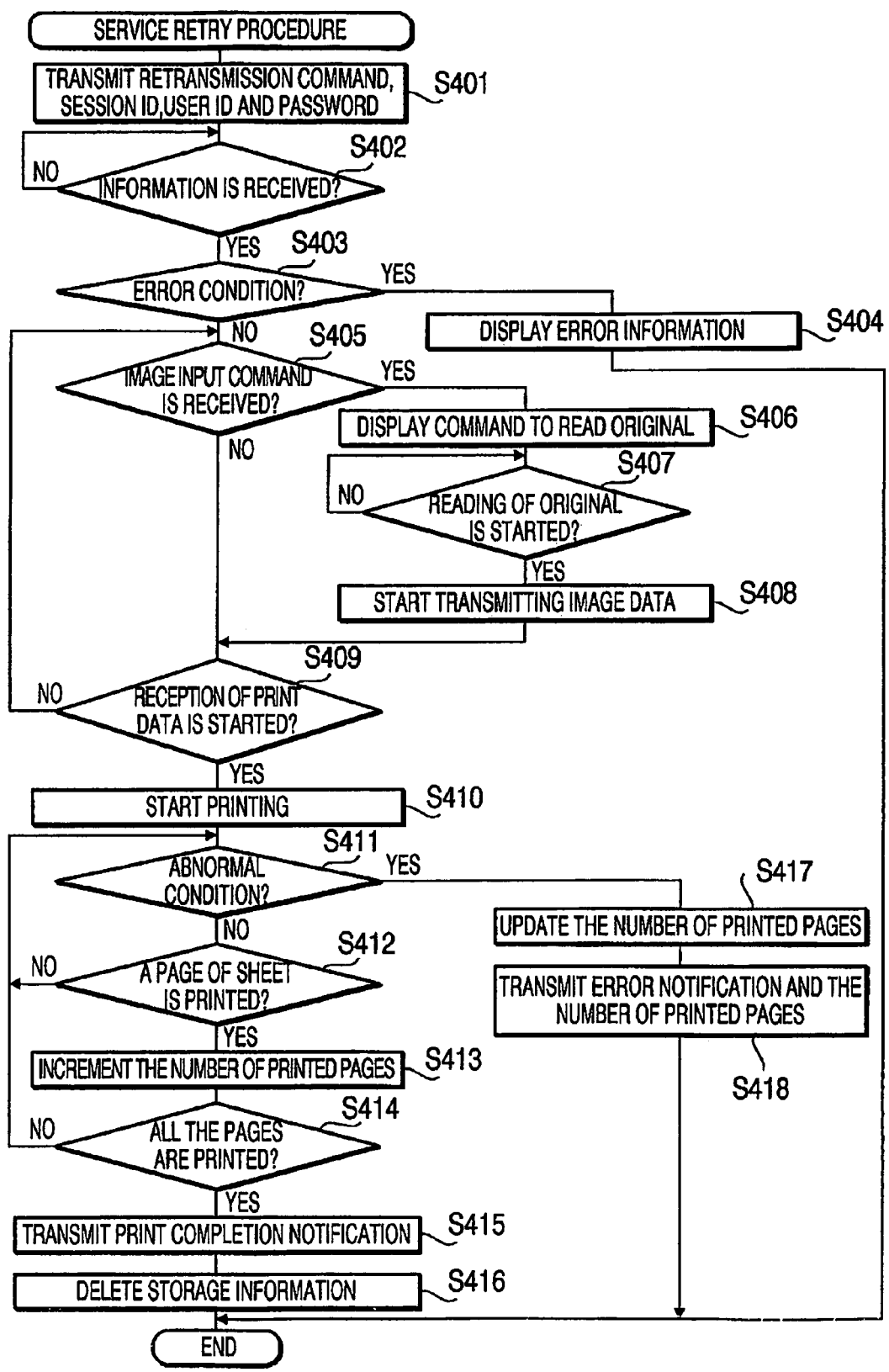
FIG. 10 shows a flowchart illustrating a service retry procedure according to aspects of the invention.

Next, the service retry procedure executed by the control unit 11 of the MFP 10 will be described with reference to the flowchart shown in FIG. 10. The service retry procedure is started when the user selects a service through a retry service selection window (see FIG. 3A) displayed on the display 53 of the operation panel 12a, selects "retry" through the retry/deletion selection window (see FIG. 3B), and further the user inputs the user ID and the password through the ID input window.

It should be noted that, in the description below, a case where the retransmission of the print data is requested is described. It should be noted that any output data other than the print data is to be retransmitted, the procedure may be substantially the same.

When the service retry procedure is started, in S401, the control transmits a retransmission command for requesting the function server 20 to retransmit the print data, a session ID corresponding to the service selected through the retry service selection window (i.e., the session ID that is stored in association with the selected service name), and the user ID and password input through the ID input window to the function server 20.

In the following steps (e.g., S408, S415 and S418), the MFP 10 transmits data to be transmitted together with the session ID to the function server 20. The function server 20, then, identifies to which service the data corresponds in accordance with the received session ID.

In S402, the control judges whether the information transmitted from the function server 20 in response to the retransmission command sent in S401 has been received. If received (S402: YES), the control proceeds to S403. The information received in S402 represents whether the function server 20 can transmit the print data. For example, when the transmitted password was wrong, or when the print data corresponding to the transmitted session ID is not stored in the service output information storage 26, information indicating the error condition is transmitted. It should be noted that the information is transmitted to the MFP 10 that issued the retransmission command in S802 or S803 of an output information transmitting procedure (see FIG. 18) which is executed by the control unit 21 of the function server 20.

In S403, the control judges whether the information received in S402 indicates the error condition. If the information indicates the error condition (S403: YES), the control proceeds to S404 and displays an error message on the display 53 of the operation panel 12a Thereafter, the control finishes the service retry procedure.

If the control judges that the received information does not indicate the error condition (i.e., indicates the normal condition) (S403: NO), the control proceeds to S405, and judges whether the image input command is received from the function server 20. It should be noted that the image input command is transmitted by the function server 20 only when the original should be read in order to retransmit the print data. It should be noted that the image input command is transmitted to the MFP 10 in S805 of the output information transmitting procedure (see FIG. 18) executed by the control unit 21 of the function server 20.

In S407, the control pauses until the reading of the original by the reading unit 13 is started (i.e., until the user starts reading operation of the original). When the reading operation is started, the control proceeds to S408.

In S408, the control sequentially transmits the image data representing the image on the original (i.e., the image data generated by the reading unit 13) to the function server 20. Then, the control proceeds to S409.

If the control determines that the image input command has not been received (S405: NO), the control proceeds to S409. In S409, the control judges whether the reception of the print data which is transmitted from the function server 20 is started.

If the control determines that the reception of the print data has not been started (S409: NO), the control returns to S405. If the control determines that the reception of the print data has been started (S405: YES), the control proceeds to S410, and controls the recording unit 14 to print the image represented by the print data received from the function server 20.

In S411, the control judges whether the recording unit 14 is in an abnormal condition where the printing cannot be performed normally. If the control determines that the recording unit 14 is not in the abnormal condition (S411: NO), the control proceeds to S412. In S412, the control determines whether the printing of one recording sheet has completed.

If the control determines that the printing of one recording sheet has not yet completed (S412: NO), the control returns to S411. If the control determines that the printing of one recording sheet has completed (S412: YES), the control proceeds to S413 and increments the number P of the printed recording sheets. It should be noted that the number P of the printed recording sheets is reset to zero when the printing is started in S410. That is, the number P counts the number pf sheets on which printing has been executed.

In S414, the control judges whether all the print data has been printed (all the pages have been printed). If the control determines that all the print data has not been printed, the control returns to S411. Thus, the control continues the printing operation until the recording unit finishes the printing operation for all the print data.

If the control determines that the all the print data has been printed (S414: YES), the control proceeds to S415, and transmits a print completion notification that notifies of the completion of the printing operation for printing all the images represented by the print data to the function server 20.

Next, in S416, the control deletes information (the service name, usage date/time, session ID and the number P of printed sheets) corresponding to the print data that has been printed from among the information (see FIG. 4) related to the services which have not been completed normally and stored in the storage unit 16. Thereafter, the control finishes the service retry procedure.

If the control determines that the abnormal condition has occurred (S411: YES), the control proceeds to S417 and updates the number P of the printed sheets stored in the storage unit 16 in association with the session ID.

In S418, the control transmits an error notification indicating the occurrence of the abnormal condition and the number P of the printed sheets to the function server 20. Then, the control finishes the service retry procedure.

Figure 11:
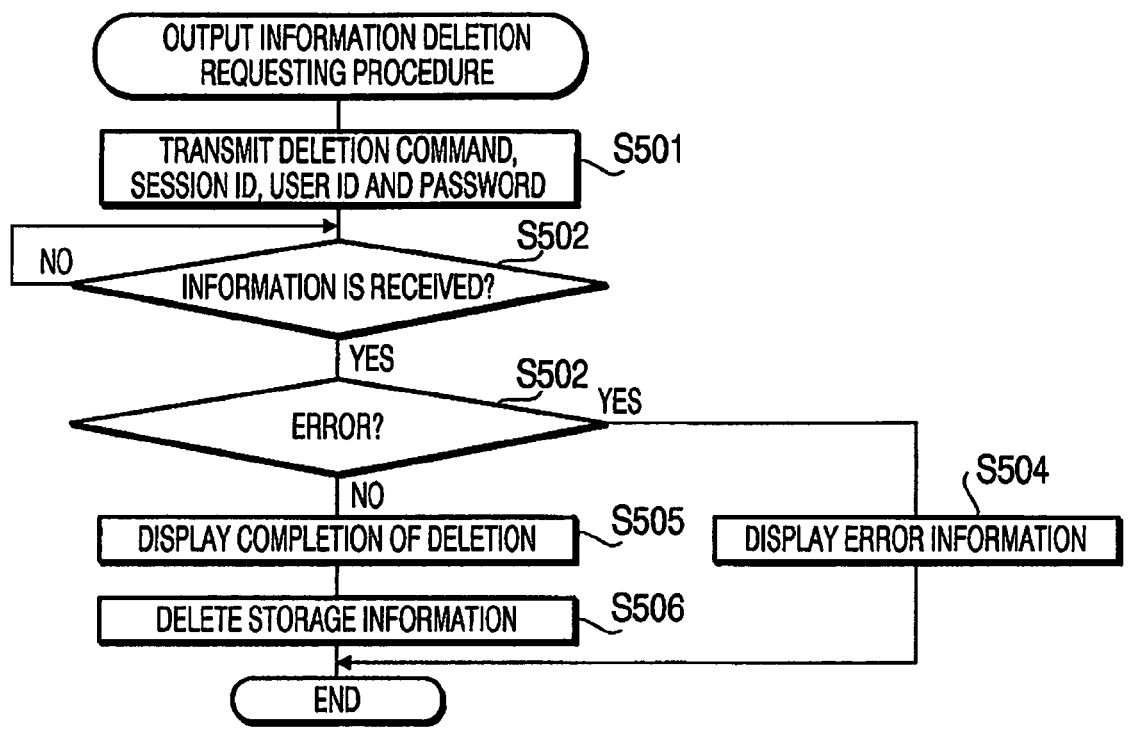
FIG. 11 shows a flowchart illustrating an output information deletion request procedure according to aspects of the invention.

Next, the output information deletion request procedure executed by the control unit 11 of the MFP 10 will be described with reference to a flowchart shown in FIG. 11. The output information deletion request procedure is executed when a service is selected through the retry service selection window (see FIG. 3A) displayed on the display 53 of the operation panel 12*a* of the MFP 10, "deletion" is selected in the retry/deletion section window (see FIG. 3B), and the user ID and the password have been input through the ID input window.

When the output information deletion request procedure is started, in S501, the control transmits a deletion command requiring the function server 20 to delete the output data, session ID corresponding to the service selected through the retry service selection window (i.e., the session ID stored in the storage unit 16 in association with the selected service name), and the user ID and the password input through the ID input window to the function server 20.

Next, in S502, the control judges whether the information which is transmitted by the function server 20 in response to the deletion command transmitted in S501, is received. If the control determines that the information is received (S502: YES), the control proceeds to S503. The information received here is the information indicating whether the function server 20 can delete the output data. For example, if the transmitted password was wrong, or the output data corresponding to the transmitted session ID is not stored in the service output information storage 26, the information indicating the error state is transmitted from the function server 20. It should be noted that this information is transmitted to the MFP 10 that issued the deletion command in S902 or S904 of an output information deletion procedure (see FIG. 19), described later, which is executed by the control unit 21 of the function server 20.

In S503, the control judges whether the received information indicates the error state. If the received information indicates the error state (S503: YES), the control proceeds to S504 and displays an error message on the display 53 of the operation panel 12*a*. Then, the control finishes the output information deletion request procedure.

If the received information does not indicate the error state (i.e., information indicating that output data has been deleted) (S503: NO), the control proceeds to S505, and displays a completion message indicating that the deletion of the output data has completed on the display 53 of the operation panel 12*a*.

Next, in S506, the control deletes, from among the information related to the services which have not been completed normally and stored in the storage unit, information corresponding to the deleted output data (the service names regarding the services in which the printing is completed, the usage date/time, the session ID and the number P of print-completed recording sheet). Thereafter, the control finishes the output information delete request procedure is terminated.

Figure 12:
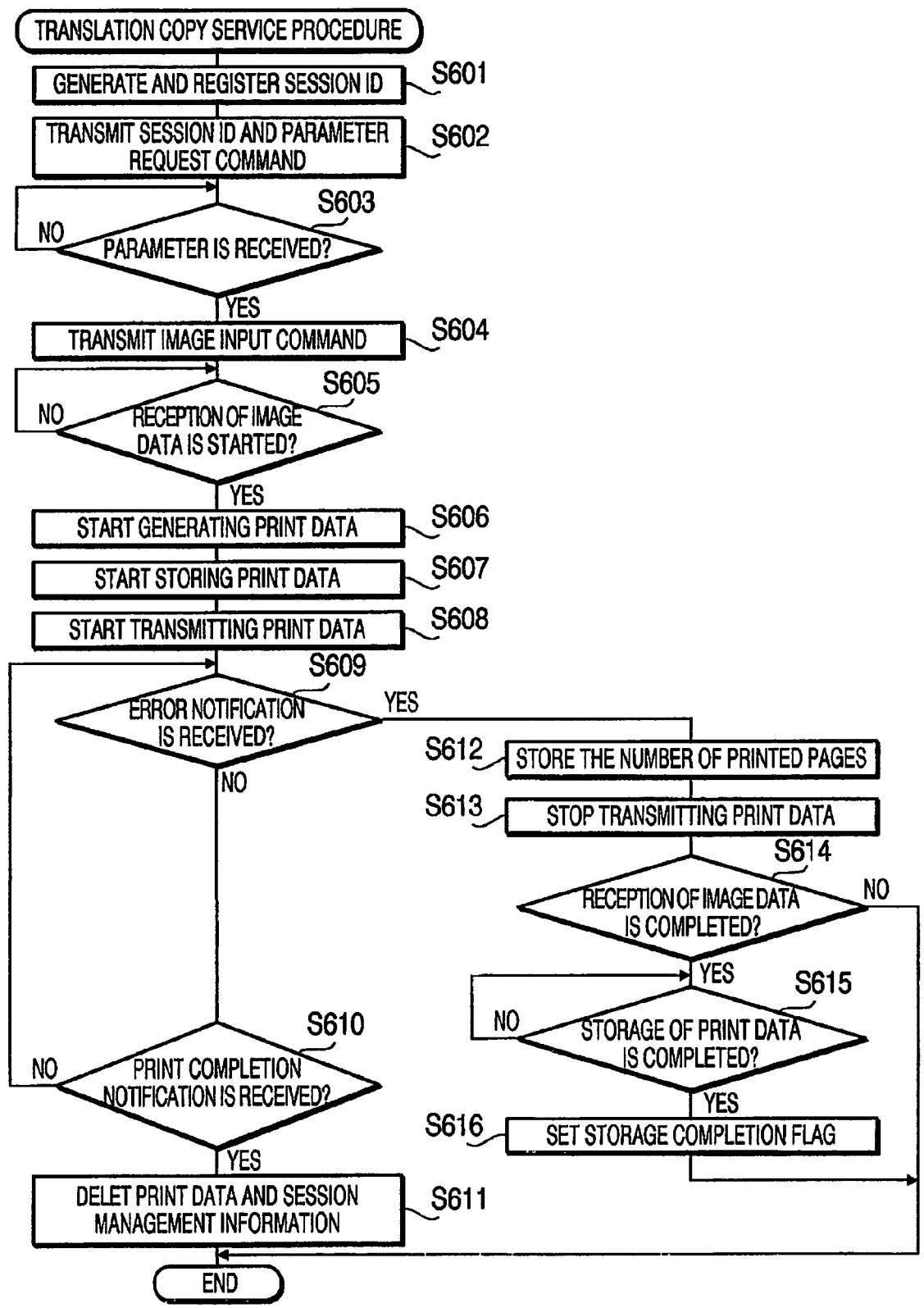
FIG. 12 shows a flowchart illustrating a translation copy service procedure according to aspects of the invention.

Next, the translation copy service executed by the control unit 21 of the function server 20 will be described with reference to the flowchart shown in FIG. 12. The translation copy service is started when the service startup command requesting execution of the translation copy service is received from the MFP 10. It should be noted that the service startup command is transmitted in S101 of the copy service usage procedure (FIG. 5) described above.

Figures 13, 14:
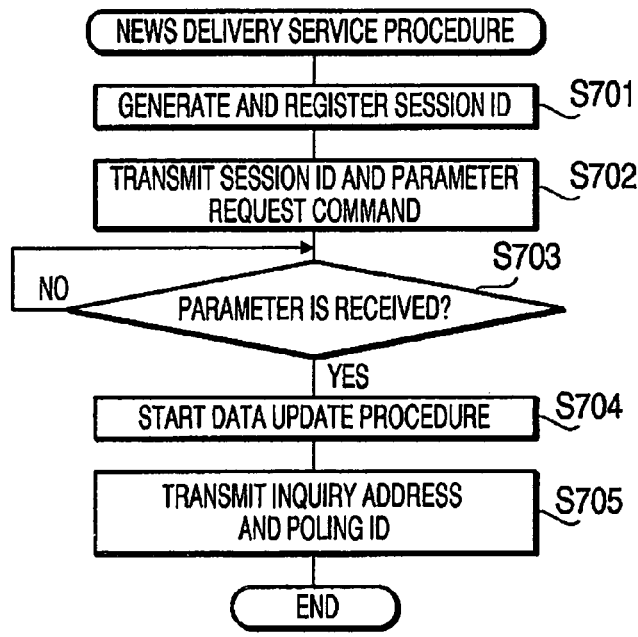
FIG. 13 shows a data structure of session management information stored in a session management information storage unit of a function server according to aspects of the invention.
FIG. 14 shows a flowchart illustrating a news delivery service procedure according to aspects of the invention.

When the translation copy service is started, in S601, the control generates session IDs intrinsic to respective service requests, and registers the generated session IDs in the session management information storage 24 of the storage unit 23 as the session management information. Specifically, as shown in FIG. 13, the session management information storage 24 includes, as the session management information, the user ID, the session ID, the number of printed sheets, the file name and the storage completion flag. The user ID equals to the user ID transmitted from the MFP 10 together with the service startup command (i.e., the user ID of the user who requested the service).

The number of the printed sheets represents the number of recording sheets on which images transmitted to the MFP 10 have been printed, and this value is transmitted from the MFP 10. The file name is the name of the print data file transmitted to the MFP 10 for providing the service. The file name is registered when the print data is generated. The storage completion flag is a flag indicating whether the output data has been stored on the function server side ("0": not completed; "1": completed).

In S602, the control transmits the session IDs generated in S601 and a parameter request command requesting for settings of parameters necessary for the service to the MFP 10.

In S603, the control judges whether a parameter is received from the MFP 10 in response to the transmission of the parameter request command in S602. If the parameter is received (S603: YES), the control proceeds to S604. It should be noted that the parameter is transmitted by the MFP 10 in S205 of the copy service usage procedure (FIG. 5).

In S604, the control transmits an image input command requesting for the image data representing the original image that is subjected to the translation copy service to the MFP 10. Then, in S605, the control judges whether reception of the image data (which is generated in the MFP 10 by reading the original using the reading unit 13 of the MFP 10) is started. If the reception of the image data from the MFP 10 is started (S605: YES), the control proceeds to S606. It should be noted that the image data is started to be transmitted in S109 of the copy service usage procedure (FIG. 5).

In S606, the control start generating the print data. Specifically, the control applies an OCR (Optical Character Recognition) process to the image data received from the MFP 10 to extract a text included in the image. Then, a translation process is applied to the extracted text (i.e., the translation process based on the parameter received in S603). Further, to the translated text, a print layout is set and generates print data representing an image of the translated text.

In S607, the control stores the print data generated in S606 in the service output information storage 26 of the storage unit 23. Next, in S608, the print data generated in S606 is transmitted to the MFP 10. In S609, the control judges whether an error notification notifying the occurrence of an abnormal state from the MFP 10. If the control determines that the error notification has not been received (S609: NO), the control proceeds to S610 and judges whether the print completion notification notifying the printing has been completed from the MFP 10.

If the control determines that the print completion notification has not been received (S610: NO), the control returns to S609. If the print completion notification has been received (S610: YES), the control proceeds to S611 and deletes the print data and the session management information. Specifically, the control refers to the session management information stored in the session management information storage 24, and based on the file name stored therein in association with the session ID that has been received together with the print completion notification, the control deletes the print data corresponding to the session ID from among the output data stored in the service output information storage 26. The control further deletes the session management information (i.e., the user ID, session ID, the number of printed sheets and the file name) which is registered in relation with the session ID. Thereafter, the control finishes the translation copy service procedure.

If the control determines that the error notification has been received (S609:YES), the control proceeds to S612 and stores the number of the printed sheets received together with the error notification as the number of the printed sheets of the session management information stored in the session management information storage 24.

In S613, transmission of the print data is terminated. Then, in S614, the control judges whether the reception of the image data from the MFP 10 has completed.

If the reception of the image data has not completed (S614: NO), the control finishes the translation copy service.

If the control determines that the reception of the image data has completed (S614: YES), the control proceeds to S615 and judges whether storage of the print data has completed. If the storage of the print data has completed (S615: YES), the control proceeds to S616. That is, if the reception of the image data has completed, the control continues the procedure until the generation and storage of the print data have completed.

In S616, in order to indicate that the storage of the print data has completed, the control sets the storage completion flag. Specifically, the control sets the value of the storage completion flag, which is included in the session management information stored in the session management information storage 24 and is stored in association with the session ID received together with the error notification to "1".

Next, a news delivery service executed by the control unit 21 of the function server 20 will be described with reference to the flowchart shown in FIG. 14. The news delivery service is started when the service startup command requesting the news delivery service is received from the MFP 10. It should be noted that the service startup command is transmitted in S201 of the delivery service usage procedure (FIG. 7).

When the new delivery service procedure is started, in S701, the control generates the session IDs intrinsic to respective service requests, and register the generated session IDs with the session management information (FIG. 13) which is stored in the session management information storage 24 of the storage unit 23.

Next, in S702, the session IDs generated in S701 and the parameter request command requesting for the setting of the parameters necessary for providing the service to the MFP 10.

In S703, the control judges whether the parameters transmitted form the MFP 10 in response to the parameter request command have been received. If the parameters have been received (S703:YES), the control proceeds to S704. It should be noted that the parameter is transmitted in S205 of the delivery service usage procedure (FIG. 7).

In S704, the control starts the data updating procedure, which will be described later. Next, in s705, the control transmits the inquiry address and poling ID to the MFP 10. Thereafter, the control finishes the new delivery service procedure. It should be noted that the function server 20 stores the poling ID and the session ID in relation to each other.

Figure 15:
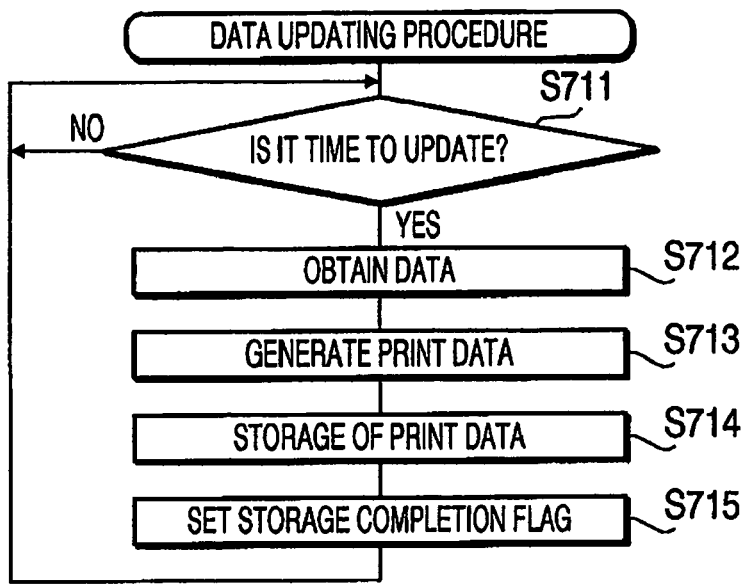
FIG. 15 shows a flowchart illustrating a data update procedure according to aspects of the invention.

Next, the data updating procedure which is called in S704 of the news delivery service procedure will be describe with reference to the flowchart shown in FIG. 15.

When the data updating procedure is started, in S711, the control judges whether it is time to update the print data. If the control determines that it is time to update the print data (S711:YES), the control proceeds to S712. That is, in the data updating procedure, steps following S712 are periodically (e.g., at a predetermined time every day) executed, and the control judges the timing in S712.

In S712, the control obtains the latest new data (e.g., the news data corresponding to the parameter received in S703 of the news delivery service procedure) from a predetermined database.

Then, in S713, the control generates print data representing image of the news by setting a print layout with respect to the news data obtained in S712. In S714, the control stores the thus generated print data in the service output information storage 26 of the storage unit 23.

In S715, in order to indicate that the storage of the print data has completed, the control sets the storage completion flag. Specifically, the control sets the value of the storage completion flag, which is included in the session management information stored in the session management information storage 24 and stored in association with the session ID received together with the parameter in S703, to "1". Then, the control returns to S711.

Figure 16:
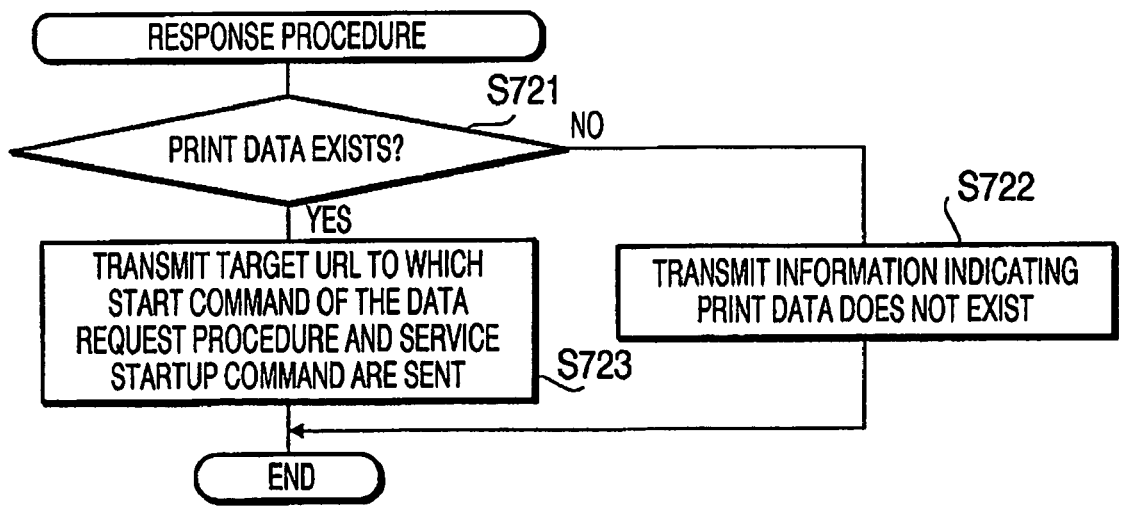
FIG. 16 shows a flowchart illustrating a response procedure according to aspects of the invention.
Figure 17:
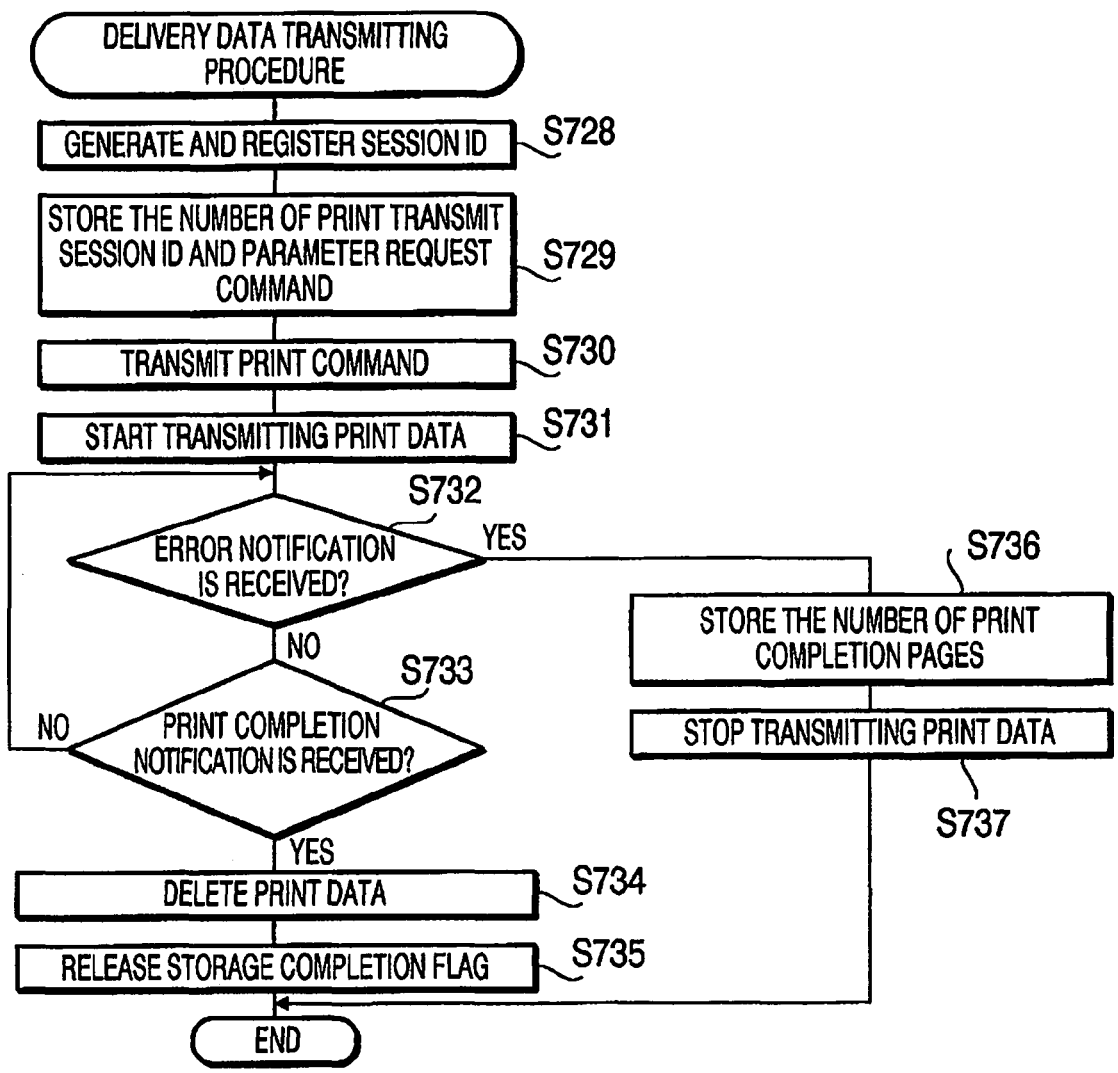
FIG. 17 shows a flowchart illustrating a delivery data transmission procedure according to aspects of the invention.

Next, a response procedure which is executed by the control unit 21 of the function server 20 when the data inquiry is received from the MFP 10 will be described with reference to the flowchart shown in FIG. 16. It should be noted that the data inquiry is transmitted to the function server 20 in S302 of the data inquiry procedure (FIG. 8).

When the response procedure is started, in S721, the control judges whether the print data to be transmitted (i.e., untransmitted print data), in response to the data inquiry, to the MFP 10 exists. Specifically, the control refers to the session management information stored in the session management information storage 24, and if the storage completion flag stored in association with the session ID corresponding to the poling ID received together with the data inquiry is set to "1", the control determines that there is untransmitted print data, while, if the flag is set to "0", the control determines that the there is no untransmitted data.

If the control determines that there is no untransmitted data (S721: NO), the process proceeds to S722, and transmits information indicating the there is no print data to be transmitted to the MFP 10 to the MFP 10. Thereafter, the control finishes the response procedure.

If the control determines that there is print data to be transmitted to the MFP 10 (S721: YES), the control proceeds to S723 and transmits a start command of the data request procedure (see FIG. 9) and the destination URL to which the service startup command is to be transmitted to the MFP 10. Thereafter, the control finishes the response procedure.

The delivery data transmitting procedure which is executed when the function server 20 receives the service startup command from the MFP 10 will be described with reference to the flowchart shown in FIG. 16. It should be noted that the service startup command received here is transmitted in S308 of the data request procedure (see FIG. 9)

When the delivery data transmitting procedure is started, in S728, the control generates the session ID. Then, in S729, the control transmits the session ID generated in S728, and a parameter request procedure which requests for the parameters necessary for the service, to the MFP 10.

In S730, the control transmits the print command which requests for start of printing to the MFP 10. It should be noted that transmission of the print command may be done a predetermined period after the transmission of the parameter request command in S729 (i.e., after it is confirmed that print terminating procedure is not interrupted in the MFP 10).

In S731, the control starts transmitting the print data stored in the service output information storage 26 of the storage unit 23 to the MFP 10. Then, in S732, the control judges whether the error notification indicating the occurrence of an error condition is received from the MFP 10.

If the control determines that the error notification has not been received (S732: NO), the control proceeds to S733, and judges whether the print completion notification indicating the completion of the printing has been received from the MFP 10.

If the control determines that the print completion notification has not been received (S733: NO), the control returns to S732. If the control determines that the print completion notification has been received (S733: YES), the control proceeds to S734 and deletes the print data. Specifically, the control refers to the session management information stored in the session management information storage 24, and, based on the file name stored therein in association with the session ID received together with the print completion notification, the control deletes the print data.

In S735, the control releases the storage completion flag. Specifically, the control sets, among the session management information stored in the session management information storage 24, the value of the storage completion flag corresponding to the session ID received together with the parameter in S703 to "0". Then, the control finishes the delivery data transmitting procedure.

If the control determines that the error notification has been received (S732: YES), the control proceeds to S736, and stores the number of printed sheets received together with the error notification in the session management information storage 24 as the number of printed sheets of the session management information. Then, in S737, the control stops transmitting the print data. Thereafter, the control finishes the delivery data transmitting procedure.

Figure 18:
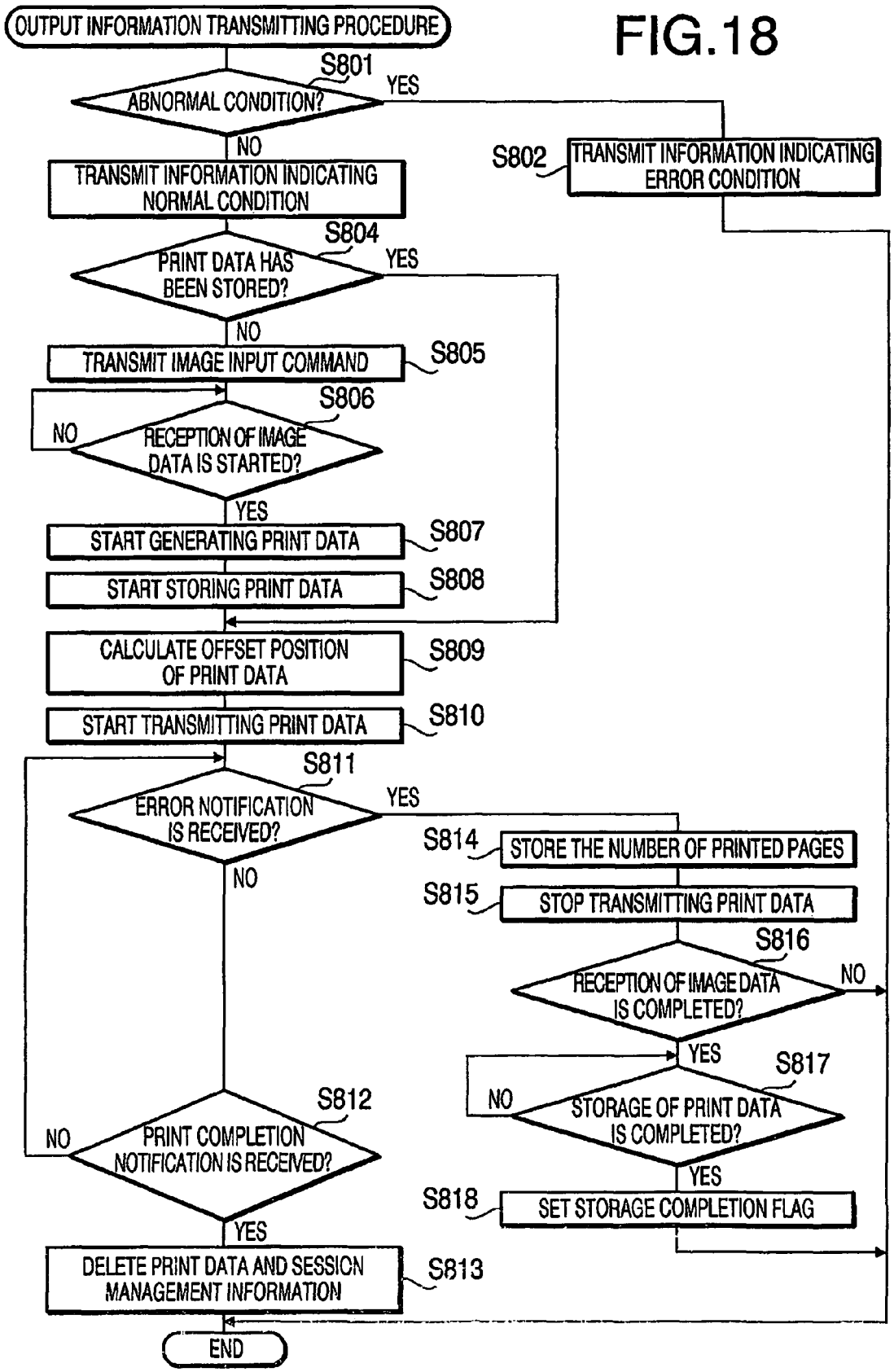
FIG. 18 shows a flowchart illustrating an output information transmission procedure according to aspects of the invention.

Next, the output information transmitting procedure executed by the control unit 21 of the function server 20 when the retransmission command is received from the MFP 10 will be described with reference to the flowchart shown in FIG. 18. It should be noted that the retransmission command is transmitted in S401 of the service retry procedure (FIG. 10).

When the output information transmitting procedure is started, in S801, the control judges whether there is an abnormal state in the information (i.e., the session ID, user ID and the password) received together with the retransmission command. Specifically, for example, if the password received together with the retransmission command is wrong, the control determines that there is an abnormal state in the received information.

If the control determines that there is the abnormal state (S801: YES), the control proceeds to S802, and transmits information indicating an error state to the MFP 10. Then, the control finishes the output information transmitting procedure.

If the control determines that there is no abnormal state (S801: NO), the control proceeds to S803 and transmits information indicating the normal state to the MFP 10.

In S804, the control judges whether the print data requested for by the retransmission command is stored in the service output information storage 26. Specifically, the control refers to the session management information stored in the session management information storage 24, and determines that the print data is stored if the storage completion flag corresponding to the session ID received together with the retransmission command is set to "1", while determines that the print data is not stored if the storage completion flag is set to "0".

If the control determines that the print data is not stored (S804: NO), the control proceeds to S805 and transmits the image input command requesting that the image data representing the image of the original is transmitted to the MFP 10.

Next, in s806, the control judges whether the reception of the image data (i.e., the image data generated by the reading unit 13 of the MFP 10 as it reads the original) is started. If the control determines that the reception of the image data is started (S806: YES), the control proceeds to S807. It should be noted that the transmission of the image data is started in S408 of the service retry procedure (FIG. 10).

In S807, the control starts generating the print data. Then, in S808, the control starts storing the print data generated in S807 in the service output information storage 26 of the storage unit 23. Then, the control proceeds to S809.

If the control determines that the print data is stored (S804: YES), the control proceeds to S809. In S809, the control calculates an offset position of the print data. Specifically, the control refers to the session management information stored in the session management information storage 24, and based on the number of the printed sheets stored therein in correspondence with the session ID received together with the retransmission command, the control determines the portion of the print data which has not yet been printed. For example, if the number of the printed sheets is "3", the control determines a position of the 4th page onwards in the print data In S810, the control starts transmitting portion of the print data which has not been printed to the MFP 10 based on the offset position obtained in S809. Then, in S811, the control judges whether the error notification has been received from the MFP 10.

If the control determines that the error notification has not been received (S811: NO), the control proceeds to S812 and judges whether the print completion notification notifying that the printing has been completed has been received from the MFP 10.

If the control determines that the print completion notification has not been received (S812: NO), the control returns to S811. If the control determines that the print completion notification has been received (S812: YES), the control proceeds to S813 and deletes the print data and the session management information. Specifically, the control refers to the session management information stored in the session management information storage 24, and based on the file name corresponding to the session ID received together with the print completion notification, the control deletes the print data corresponding to the session ID from among the output data stored in the service output information storage 26, and further deletes the session management information (i.e., the user ID, the session ID, the number of printed sheets and the file name) corresponding to the session ID. Then, the control finishes output information transmitting procedure.

If the control determines that the error notification has been received (S811: YES), the control proceeds to S814, and stores the number of printed sheets received together with the error notification in the session management information storage 24 as the number of the printed sheets of the session management information.

In S815, the control stops transmitting the print data. Then, in S816, the control judges whether the reception of the image data from the MFP 10 has been completed.

If the control determines that the reception of the image data has not been completed (S816: NO), the control finishes the output information transmitting procedure. If the control determines that the reception of the image data has been completed (S816: YES), the control proceeds to S817 and judges whether the storage of the print data has completed. If the storage of the print data has completed (S817: YES), the control proceeds to S818. That is, if the image data has been received, the control continues the procedure until the print data is generated and stored.

In S818, the control sets the storage completion flag indicating that the print data has been stored. Specifically, the control sets, within the session management information stored in the session management information storage 24, the storage completion flag corresponding to the session ID received together with the error notification to "1". Then, the control finishes the output information transmitting procedure.

Figure 19:
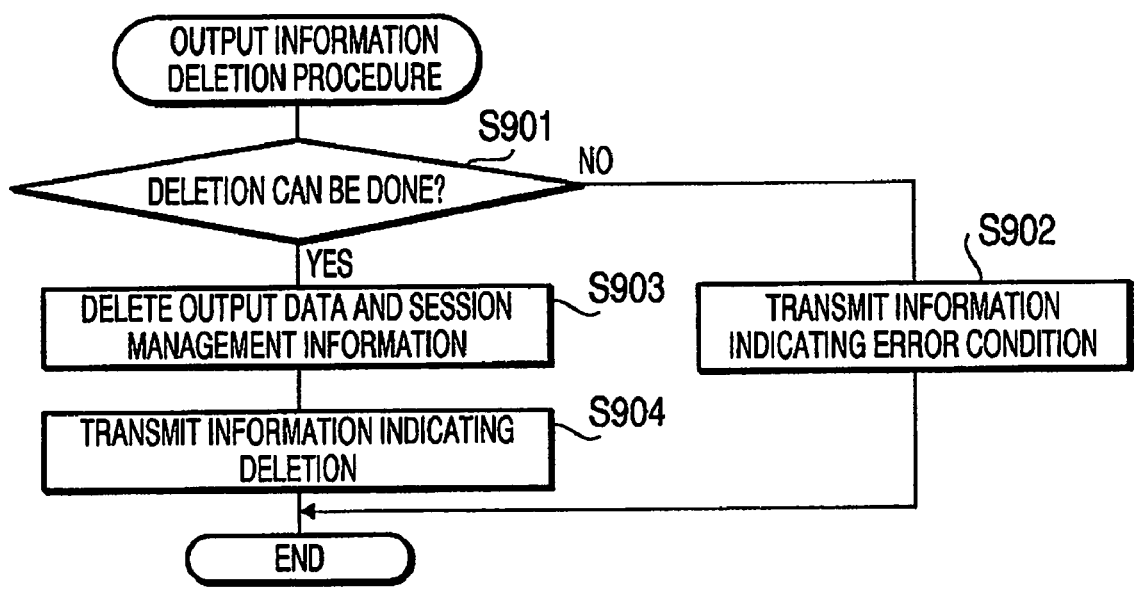
FIG. 19 shows a flowchart illustrating an output information deletion procedure according to aspects of the invention.

Next, the output information deletion procedure executed by the control unit 21 of the function server 20, when the deletion command is received from the MFP 10, will be described with reference to the flowchart shown in FIG. 19. It should be noted that the deletion command is transmitted in S501 of the output information deletion request procedure (FIG. 11) described above.

When the output information deletion procedure is started, in S901, the control judges whether the output data can be deleted. The control determines that the output data can be deleted when the password received together with the deletion command is wrong, or when the output data corresponding to the session ID is not stored in the service output information storage 26 of the storage unit 23, the control determines that the output data cannot be deleted.

If the control determines that the output data cannot be deleted (S901: NO), the control proceeds to S902 and transmits information indicating an error to the MFP 10. Then, the control finishes the output information deletion procedure.

If the control determines that the output data can be deleted (S901: YES), the control proceeds to S903 and deletes the output data and the session management information. Specifically, the control refers to the session management information stored in the session management information storage 24, and based on the file name corresponding to the session ID received together with the deletion command, the control deletes the output data corresponding to the session ID among the output data stored in the service output information storage 26. Further, the control also deletes the session management information (i.e., the user ID, the session ID, the number of printed sheets and the file name) corresponding to the session ID.

Next, in S904, the control transmits information indicating that the output data has been deleted to the MFP 10. Then, the control finishes the output information deletion procedure.

According to the communication system described above, when the MFP 10 operates in an abnormal condition where the image represented by the print data received from the function server 20 cannot be printed normally (S112: YES; S314: YES), the transmission of the print data by the function server 20 is terminated (S613, S737). Thereafter, when the MFP 10 requests the function server 20 to retransmit the print data which cannot be normally printed (S401), the print data is retransmitted from the function server 20 to the MFP 10 (S810).

As above, when the MFP 10 transmits the retransmission request to the function server 20, the function server 20 retransmits the print data to the MFP 10. Therefore, according to the communication system, after the abnormal condition, where the MFP 10 cannot perform the printing operation, is cleared, when the MFP 10 transmits the retransmission request to the function server 20, it is ensured that the print data is retransmitted after the abnormal condition of the MFP 10 is resolved. In other words, a case where the print data is retransmitted from the function server 20 to the MFP 10 before the abnormal condition of the MFP 10 is resolved can be prevented. As a result, the superfluous communication for retransmitting the print data can be suppressed. In particular, during the printing process, the abnormal condition (e.g., running out of the recording sheet, toner or ink) may occur relatively easily. Therefore, it is very effective and convenient if the communication system is configured such that the MFP 10 requests the function server 20 for the retransmission of the print data.

Figure 8:
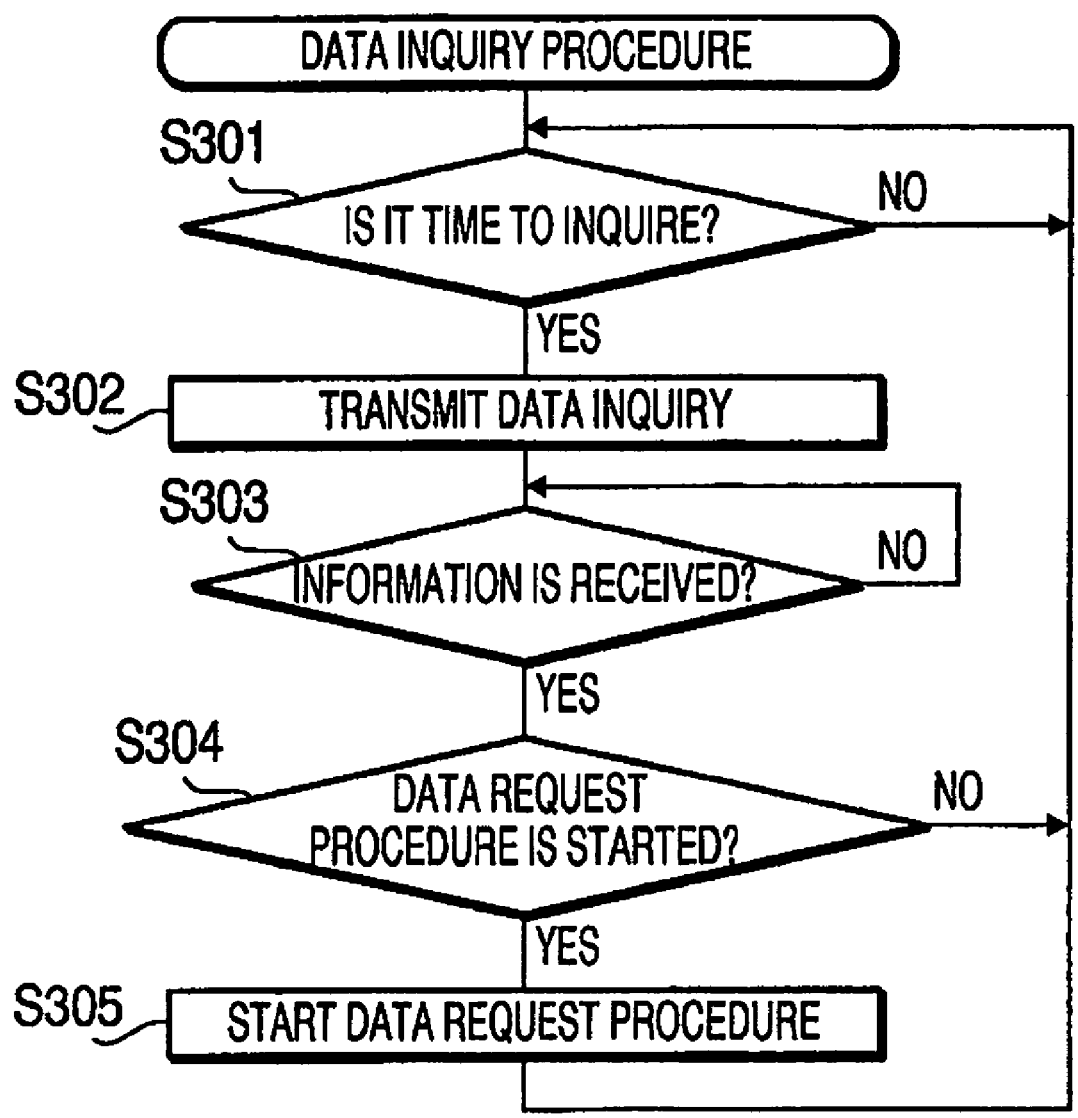
FIG. 8 shows a flowchart illustrating a data inquiry procedure according to aspects of the invention.

In the news delivery service, the MFP 10 performs a process of periodically transmitting the data inquiry to check whether the requested print data is available (i.e., the poling process) (see FIG. 8). Such a process can be performed even if the user is remote from the MFP 10. If the user is remote from the MFP 10 if the abnormal condition occurs, it would take relatively long period until the abnormal condition is dissolved. Thus, the configuration that the retransmission of the print data is prevented unless the abnormal condition is dissolved is effective.

In the translation copy service, the user of the MFP 10 needs to have the reading unit 13 read the image on the original and transmits the obtained image data to the function server (S107). According to the embodiments, if the function server 20 has already received the image data representing the original image, transmission of the image data is not requested (S804: YES). Therefore, it is less troublesome for the user of the MFP 10 since the process of reading the original can be omitted. In particular, the function server 20 is configured such that, when the image data representing the original image has been received, even if an error occurs in the MFP 10, the print data is generated based on the received image data and stores the same (S614: YES, S615). Therefore, the function server 20 can transmit the print data immediately in response to the retransmission request by the MFP 10.

The function server 20 stores the file name of the print data which has not been printed normally by the MFP 10 in association with the session ID (see FIG. 13). Therefore, even if multiple pieces of print data are stored in the service output information storage 26, the requested piece of print data can be retransmitted without fail.

It is appreciated that the invention needs not be limited to the configuration described above with reference to the illustrative embodiment. The invention can be modified in various ways without departing from aspects of the invention.

For example, in the communication system according to the illustrative embodiment, when it is determined that the MFP 10 normally prints the image represented by the print data (S414: YES), the information related to the service (i.e., the service name, usage date/time, session ID and the number of printed sheets) stored in the storage unit 16 is deleted (S416) on the MFP 10 side. On the function server 20 side, the print data stored in the service output information storage 26 is deleted (S611, S734 and S813). With this configuration, the print data cannot be retransmitted from the function server 20 to the MFP 10. However, the invention needs not be limited to have such a configuration, and the print data the MFP 10 is considered to print normally may not be deleted on the function server 20 and may be made re-transmissible to the MFP 10. With such a configuration, if, for example, the recording sheet on which the image is printed is folded, the image tone density is in appropriate, or the like, i.e., the MFP 10 may determine that the printing has been normally completed although the printing was not normally completed, it become possible to retransmit the print data from the function server 20 to the MFP 10. It should be noted, however, if the function server is configured to charge a fee for the service request by the MFP 10, it is preferable to limit the retransmission of the print data as in the illustrative embodiment.

In the communication system according to the illustrative embodiment, when the retransmission request of the print data regarding the translation copy service is made by the MFP 10 (S401), if the print data is not stored on the function server 20 (i.e., transmission of the image data generated by the MFP 10 and to be transmitted to the function server 20 when the translation copy service is requested has not completed (S804: NO), the control requests the MFP 10 to transmits the image data (S805). This may be modified such that the image data which has already been transmitted will not be transmitted. That is, in the translation copy service, the image data representing the images formed on the original is transmitted from the MFP 10 to the function server 20 (S109). In such case, the function server 20 may store the received image data even if an error occurs on the MFP 10 side before the reception of the image data is completed. Then, the function server 20 is configured such that when the retransmission request of the print data is received from the MFP 10, the function server 20 requests the MFP 10 to transmit lacking portion of the image data. With this configuration, it becomes unnecessary on the MFP 10 side to read the original again, and thus, the user's operation to read the original can be omitted on the MFP 10 side. In particular, by making use of an ADF mechanism, original documents unnecessary to read are skipped automatically, the user's operation is more facilitated.

Figure 3A:
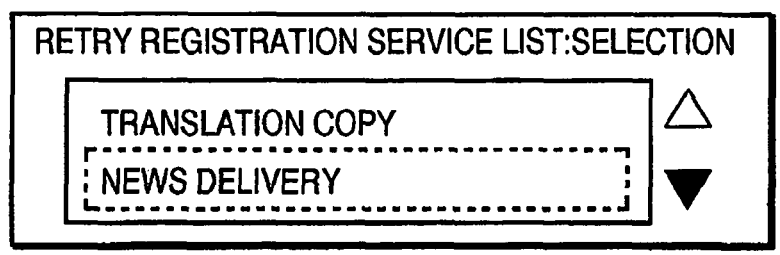
FIGS. 3A and 3B show retry service selection windows respectively showing different indications.
Figure 3B:
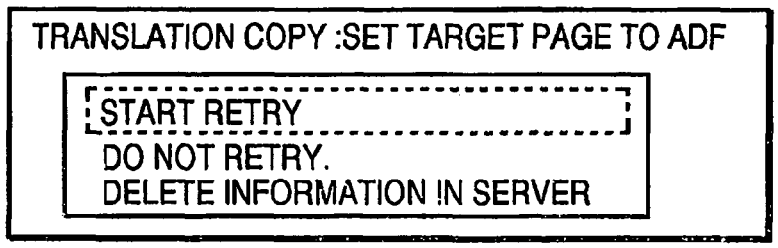

Further to the above, according to the communication system described above, on the retry service selection window allowing the user to select the services for which the retry is to be requested, a list of service names are displayed (see FIG. 3A). This configuration may be modified such that usage date/time is displayed in addition to or instead of each service name. With such a modification, even when the same service is used repeatedly, the user can select the desired service.

In the illustrative embodiment, the function server 20 executes, for example, the procedure of providing the translation copy service (FIG. 12) as a series of processes. However, the invention needs not be limited to such an configuration. For example, a task of having the user perform input operation (e.g., input of the parameter) to the MFP 10, a task asking the user to operate to read the image of the original, and a task to transmit the print data to the MFP 10 may be independently executable (multi-task environment) and service programs respectively corresponding to multiple services may be start up necessary tasks so that each service is provided appropriately.

In the above-described illustrative embodiment, retransmission of the print data is described as an example of the retransmission of the output data. It should be appreciated that other types of data (e.g., sound data) may also be handled in the similar way. For example, a read-aloud service may be executed as follows. The MFP 10 reads the original with the reading unit 13 and extracts the text from the image data. Then, the function server 20 converts the text to sound data representing the read-aloud sound of the text, and transmits the sound data to the MFP 10. Then, the MFP 10 outputs the sound data through the sound output unit 18. If output of the sound represented by the sound data transmitted from the function server 20 is terminated due to an error condition of the MFP 10, it may be possible that the MFP 10 requests the function server 20 to retransmit the sound data.

What is claimed is:

1. A communication system including a transmission apparatus configured to transmit output data and a reception apparatus configured to receive the output data, the transmission apparatus and the reception apparatus configured to communicate with each other,
wherein the reception apparatus comprises:
an output unit configured to execute an outputting procedure based on the output data received from the transmission apparatus;
an abnormal state notification unit configured to transmit abnormal state notification data indicating the abnormal state when the output unit cannot execute the outputting procedure normally to the transmission apparatus; and
a retransmission requesting unit configured to transmit retransmission request data requesting for retransmission of the output data if the outputting procedure is not executed normally,
wherein the transmission apparatus comprises:
an output data transmitting unit configured to transmit the output data to the reception apparatus;
a transmission terminating unit configured to terminate transmission of the output data output by the output data transmitting unit if the abnormal state notification data is received from the reception apparatus; and
an output data retransmitting unit configured to transmit the output data requested by the retransmission requesting unit to the reception apparatus when the retransmission request data is received;
wherein the output unit is configured to print images corresponding to the output data on a recording medium,
wherein the output unit is configured to start execution of the outputting procedure of the output data, while the reception apparatus is receiving the output data, and
wherein the abnormal state notification unit is configured to transmit the abnormal state notification data to be received by the transmission terminating unit, when the output unit cannot execute the outputting procedure normally, while the reception apparatus is receiving the output data.

2. The communication system according to claim 1,
wherein the reception apparatus includes a transmission requesting unit configured to transmit the transmission request data requesting for transmission of the output data to the transmission apparatus, and
wherein the output data transmitting unit is configured such that, when the transmission request data is received from the reception apparatus, the output data transmitting unit transmits the requested output data to the reception apparatus.

3. The communication system according to claim 2,
wherein the reception apparatus further includes a data inquiry unit configured to inquire the output data requested by the transmission request unit of the transmission apparatus periodically, and
wherein the output data transmitting unit is configured to output the requested output data to the reception apparatus if the inquiry is received from the data inquiry unit and the request output data exists.

4. The communication system according to claim 2,
wherein the transmission requesting unit is configured to transmit predetermined data necessary for generating the output data to the transmission apparatus in addition to the transmission request data,
wherein the transmission apparatus further comprises a data generating unit configured to generate the output data based on the predetermined data received from the reception apparatus, and
wherein the output data transmitting unit is configured to output the output data generated by the data generating unit to the reception apparatus.

5. The communication system according to claim 4,
wherein the output data retransmitting unit is configured such that, when the retransmission request data is received from the reception apparatus and if the reception of the predetermined data necessary for generating the output data requested by the retransmission request data, the output data retransmitting, unit transmits the output data generated based on the predetermined data which has already been received to the reception apparatus.

6. The communication system according to claim 5,
wherein the transmission apparatus further includes an output data storage configured to store the output data generated by the data generating unit, and
wherein the output data retransmitting unit is configured such that, if the retransmission request data is received from the reception apparatus, and the output data requested by the retransmission request data is stored in the output data storage, the output data retransmitting unit transmits the stored output data to the reception apparatus.

7. The communication system according to claim 1,
wherein the retransmission request unit is configured to transmit the retransmission request data to the transmission apparatus together with identifying information with which the output data to be retransmitted can be identified.

8. A data transmission apparatus configured to serve as a transmission apparatus for a communication system including the transmission apparatus configured to transmit output data and a reception apparatus configured to receive the output data, the transmission apparatus and the reception apparatus configured to communicate with each other,
the transmission apparatus comprising:
an output data transmitting unit configured to transmit the output data to the reception apparatus;
a transmission terminating unit configured to terminate transmission of the output data by the output data transmitting unit if abnormal state notification data is received from the reception apparatus; and
an output data retransmitting unit configure to transmit the output data requested by a retransmission requesting unit to the reception apparatus when retransmission request data is received;
wherein the reception apparatus is configured to print images corresponding to the output data on a recording medium,
wherein the output data transmitting unit is configured to execute an outputting procedure, while the reception apparatus is receiving the output data, and
wherein the abnormal state notification unit is configured to transmit the abnormal state notification data to be received by the transmission terminating unit, when the output data transmitting unit cannot execute the outputting procedure normally.

9. An output apparatus configured to serve as a reception apparatus for a communication system including a transmission apparatus configured to transmit output data and the reception apparatus configured to receive the output data, the transmission apparatus and the reception apparatus configured to communicate with each other,
the reception apparatus comprising:
an output unit configured to execute an outputting procedure based on the output data received from the transmission apparatus;
an abnormal state notification unit configured to transmit abnormal state notification data indicating the abnormal state where the output unit cannot executes execute the outputting procedure normally to the transmission apparatus; and
a retransmission requesting unit configured to transmit retransmission request data requesting for retransmission of the output data if the outputting procedures procedure is not executed normally;
wherein the output unit is configured to print images corresponding to the output data on a recording medium,
wherein the output unit is configured to execute the outputting procedure, while the reception apparatus is receiving the output data, and
wherein the abnormal state notification unit is configured to transmit the abnormal state notification data to be received by the transmission apparatus, when the output unit cannot execute the outputting procedure normally.

10. The output apparatus according to claim 9,
wherein the outputting unit is configured to print images represented by the output data on a recording medium.

11. A non-transitory computer readable storage medium having computer readable instructions stored thereon that cause a computer to serve as a data transmission apparatus configured to serve as a transmission apparatus for a communication system including the transmission apparatus configured to transmit output data and a reception apparatus configured to receive the output data, the transmission apparatus and the reception apparatus configured to communicate with each other,
the computer readable instructions configured to cause the transmission apparatus to perform the steps of:
transmitting the output data from an output data transmitting unit to the reception apparatus;
terminating transmission of the output data by the output data transmitting unit if abnormal state notification data is received from the reception apparatus;
transmitting the output data requested by a retransmission requesting unit from an output data retransmitting unit to the reception apparatus when retransmission request data is received;

printing images corresponding to the output data on a recording medium on the output data transmitting unit, executing an outputting procedure by the output data transmitting unit while the reception apparatus is receiving the output data;

transmitting the abnormal state notification data to an abnormal state notification unit, when the output data transmitting unit cannot execute the outputting procedure normally, and receiving abnormal state notification data at a transmission terminating unit.

12. A non-transitory computer readable storage medium having computer readable instructions stored thereon that cause a computer to serve as an output apparatus configured to serve as a reception apparatus for a communication system including a transmission apparatus configured to transmit output data and the reception apparatus configured to receive the output data, the transmission apparatus and the reception apparatus configured to communicate with each other, the computer readable instructions configured to cause one of the transmission apparatus and the reception apparatus to perform the steps of:

executing an outputting procedure by an output unit based on the output data received from the transmission apparatus;

transmitting abnormal state notification data indicating the abnormal state by an abnormal state notification unit, where the output unit cannot execute the outputting procedure normally to the transmission apparatus;

transmitting retransmission request data requesting for retransmission of the output data by a retransmission requesting unit, if the outputting procedure is not executed normally;

printing images corresponding to the output data on a recording medium by the output unit:

executing the outputting procedure by the output unit, while the reception apparatus is receiving the output data; and transmitting the abnormal state notification data to an abnormal state notification unit when the output data transmitting unit cannot execute the outputting procedure normally; and receiving abnormal state notification data at a transmission terminating unit.

13. The communication system according to claim 4, wherein the output data includes a plurality of pages;

wherein the transmission apparatus further comprises:

an output data storage medium configured to store the output data generated by the data generating unit, and a session management information storage unit configured to store a number of pages of a first portion of the output data, the first portion of the output data corresponding to the pages having been printed based on the output data prior to receiving the abnormal state notification data, and wherein the output data retransmitting unit transmits a second portion of the output data which corresponds to pages following a first portion of the plurality of pages, based on the number of pages of the first portion of the plurality of pages that is stored in the session management information storage unit.

* * * * *